United States Patent
Mestanov et al.

(10) Patent No.: US 10,660,017 B2
(45) Date of Patent: May 19, 2020

(54) FIRST COMMUNICATIONS DEVICE, A SECOND COMMUNICATIONS DEVICE AND METHODS THEREIN FOR DEVICE-TO-DEVICE COMMUNICATION

(71) Applicant: Telefonaktiebolaget LM Ericsson (publ), Stockholm (SE)

(72) Inventors: Filip Mestanov, Brottby (SE); Parth Amin, St Albans (GB); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/095,542

(22) PCT Filed: Apr. 22, 2016

(86) PCT No.: PCT/SE2016/050352
§ 371 (c)(1),
(2) Date: Oct. 22, 2018

(87) PCT Pub. No.: WO2017/184045
PCT Pub. Date: Oct. 26, 2017

(65) Prior Publication Data
US 2019/0090175 A1    Mar. 21, 2019

(51) Int. Cl.
*H04L 12/28*    (2006.01)
*H04W 48/08*    (2009.01)
(Continued)

(52) U.S. Cl.
CPC ........... *H04W 48/08* (2013.01); *H04W 4/023* (2013.01); *H04W 8/005* (2013.01); *H04W 48/18* (2013.01);
(Continued)

(58) Field of Classification Search
CPC ...................................................... H04W 76/14
(Continued)

(56) References Cited

U.S. PATENT DOCUMENTS 10,135,759 B2 * 11/2018 Li ....................... H04L 49/405
2014/0057667 A1 * 2/2014 Blankenship ......... H04L 67/303
455/500

(Continued)

FOREIGN PATENT DOCUMENTS

WO    2014071140 A2    5/2014
WO    2015005158 A1    1/2015

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.
(Continued)

*Primary Examiner* — John Pezzlo
(74) *Attorney, Agent, or Firm* — Sage Patent Group

(57) ABSTRACT

A first communications device (1002) and a method therein for Device-to-Device (D2D) communication with a second communications device (1004) using a first Radio Access Technology (RAT) or a second RAT. The first and second communications devices are operating in a communications network (1000). The first communications device transmits 5 the second communications device, by means of the first RAT, information relating to a proximity service provided by the second RAT. Thereby the information enables the second communications device to determine whether to use the first RAT or the proximity service provided by the second for D2D communication with the first communications device.

17 Claims, 13 Drawing Sheets

Method performed by
1st communications device 1002

(51) Int. Cl.
- *H04W 76/14* (2018.01)
- *H04W 84/04* (2009.01)
- *H04W 48/18* (2009.01)
- *H04W 8/00* (2009.01)
- *H04W 4/02* (2018.01)
- *H04W 72/12* (2009.01)
- *H04J 1/16* (2006.01)
- *H04W 88/06* (2009.01)
- *H04W 84/12* (2009.01)

(52) U.S. Cl.
CPC ....... *H04W 72/1215* (2013.01); *H04W 76/14* (2018.02); *H04W 84/04* (2013.01); *H04W 72/1231* (2013.01); *H04W 84/12* (2013.01); *H04W 88/06* (2013.01)

(58) Field of Classification Search
USPC .......................................... 370/252, 329, 386
See application file for complete search history.

(56) References Cited

U.S. PATENT DOCUMENTS

| | | |
|---|---|---|
| 2014/0273850 A1 | 9/2014 | Park et al. |
| 2015/0005158 A1 | 1/2015 | Nazarpoor et al. |
| 2015/0319596 A1 | 11/2015 | Qi et al. |
| 2015/0339718 A1* | 11/2015 | Walton ............... G06Q 30/0261 705/14.16 |
| 2016/0007257 A1* | 1/2016 | Kim ..................... H04W 76/34 370/331 |

OTHER PUBLICATIONS

3GPP, "3rd Generation Partnership Project; Technical Specification Group Services and System Aspects; Proximity-based services (ProSe); Stage 2 (Release 13)", 3GPP TS 23.303 V13.0.0, Jun. 2015, 1-97.

ETSI, "Universal Mobile Telecommunications System (UMTS); LTE; Service requirements for the Evolved Packet System (EPS) (3GPP TS 22.278 version 12.5.0 Release 12)", ETSI TS 122 278 V12.5.0, Oct. 2014, 1-44.

IEEE, "Part 11: Wireless LAN Medium Access Control (MAC) and Physical Layer (PHY) Specifications", IEEE Standard for Information technology—Telecommunications and information exchange between systems Local and metropolitan area networks—Specific requirements IEEE Std 802.11 2012 (Revision of IEEE Std 802.11-2007), Mar. 29, 2012, 1-2793.

Unknown, Author, "Inclusion of WLAN direct discovery technologies as an alternative for Prose direct discovery", 3GPP TSG-SA WG1 Meeting #77, S1-163081, Santa Cruz, Spain, Nov. 7-11, 2016, 1-6.

Unknown, Author, "New SI proposal: Feasibility Study on LTE-based V2X Services", 3GPP TSG RAN Meeting 168, RP-151109, Malmö, Sweden, Jun. 15-18, 2015, 1-7.

Unknown, Author, "Wi-Fi Aware", http://www.wi-fi.org/discover-wi-fi/wi-fi-aware, accessed Dec. 29, 2016, 1-6.

Unknown, Author, "Wi-Fi Neighbor Awareness Networking (NAN) Technical Specification V1.0 r20", Wi-Fi Alliance, Sep. 10, 2016, 1-231.

* cited by examiner

Figure 12 Method performed by 1st communications device 1002

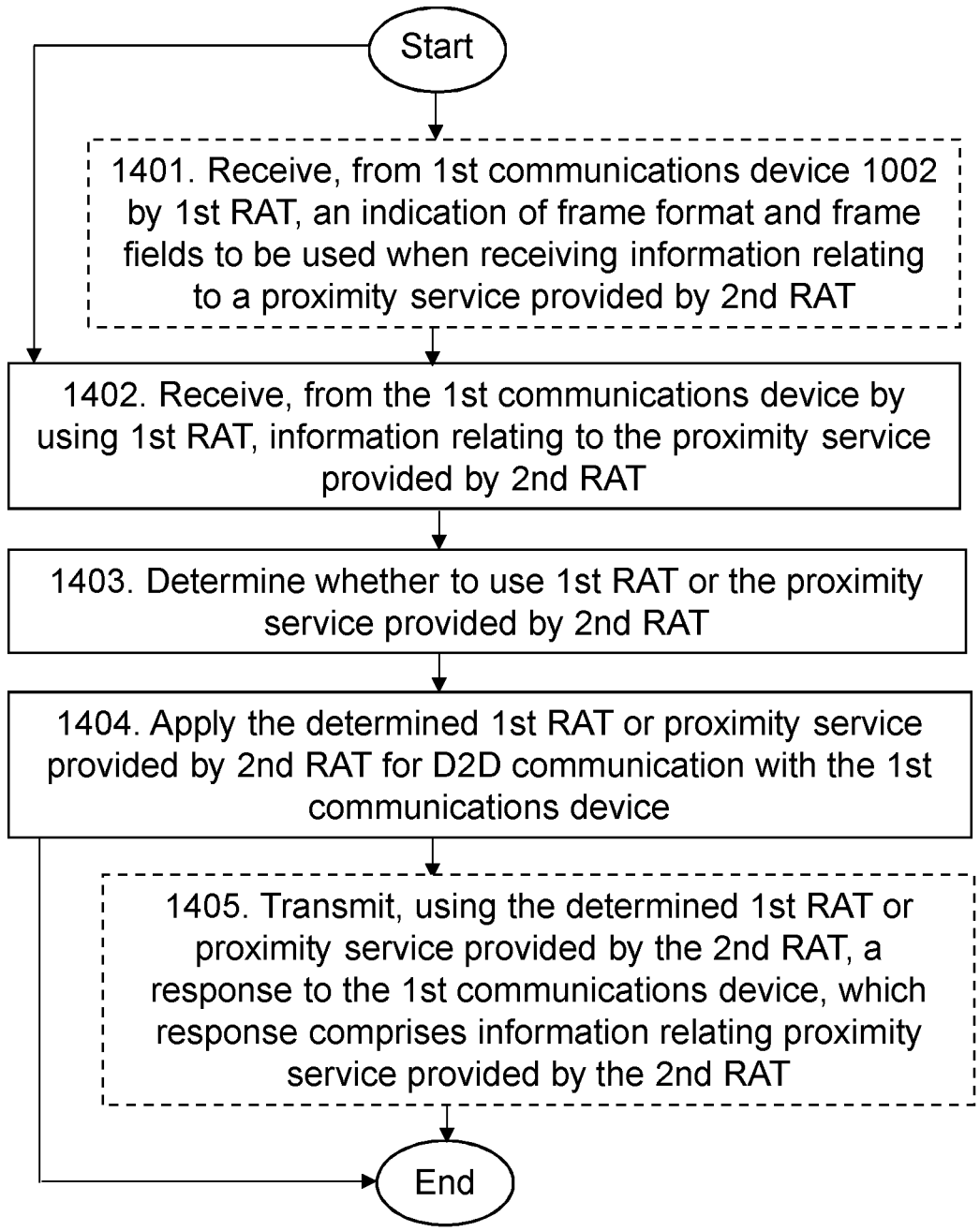
Figure 14 Method performed by 2nd communications device 1004

| Category | Public Action | Organization Identifier | NAN Attributes | LTE Prose Attributes |
|---|---|---|---|---|
| 1 | 1 | 3 | Variable | Variable |

Octets

Figure 16

| FC | Duration | A1 | A2 | A3 | Seq Ctrl | Time Stamp | Beacon Interval | Capability | NAN IE | FCS | LTE Prose Attributes |
|---|---|---|---|---|---|---|---|---|---|---|---|
| 2 | 2 | 6 | 6 | 6 | 2 | 8 | 2 | 2 | Variable | 4 | Variable |

Octets

Figure 17

FIRST COMMUNICATIONS DEVICE, A SECOND COMMUNICATIONS DEVICE AND METHODS THEREIN FOR DEVICE-TO-DEVICE COMMUNICATION

TECHNICAL FIELD

Embodiments herein relate generally to a first communications device, a second communications device, and to methods therein. In particular, embodiments relate to Device-to-Device (D2D) communication.

BACKGROUND

Communication devices such as terminals are also known as e.g. User Equipments (UE), mobile terminals, stations (STAs), wireless devices, wireless terminals and/or mobile stations. Communications devices are enabled to communicate wirelessly in a wireless communications network, such as a Wireless Local Area Network (WLAN), or a cellular communications network sometimes also referred to as a cellular radio system or cellular networks. The communication may be performed e.g. between two communications devices, between a communications device and a regular telephone and/or between a communications device and a server via an Access Point (AP) operating in an access network and possibly one or more core networks, comprised within the wireless communications network.

The above communications devices may further be referred to as mobile telephones, cellular telephones, laptops, or tablets with wireless capability, just to mention some further examples. The communications devices in the present context may be, for example, portable, pocket-storable, hand-held, computer-comprised, or vehicle-mounted mobile devices, enabled to communicate voice and/or data, via the access network, such as a Radio Access Network (RAN), with another entity, such as another communications device or a server.

The communications network covers a geographical area which is divided into geographical subareas, such as coverage areas, cells or clusters. In a cellular communications network each cell area is served by an AP such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communication device. The expression Uplink (UL) is used for the transmission path in the opposite direction i.e. from the communications device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Institute of Electrical and Electronics Engineers (IEEE) 802.11 is a set of Media Access Control (MAC) and PHYsical layer (PHY) specifications for implementing Wireless Local Area Network (WLAN) computer communication in the 2.4, 3.6, 5, and 60 GHz frequency bands. They are created and maintained by the IEEE Local Area Network (LAN)/Metropolitan Area Network (MAN) Standards Committee (IEEE 802). The base version of the standard was released in 1997, and has had subsequent amendments. The standard and amendments provide a local area wireless computer networking technology that allows electronic devices to connect to a network. A WLAN is sometimes referred to as a WiFi network.

Recently, there has been rise in the use of different radio technologies, such as WLAN technology according to the IEEE 802.11 and the 3GPP LTE radio access technology, to provide a distribution medium for device to device communication between communications devices within the proximity of each other.

Wireless connectivity may be provided over so-called social channels. By the expression "social channels" when used in this disclosure is meant communications channels enabling communication among people sharing similar interests e.g. interested in selling or buying specific services, interested in common hobbies etc. For instance, the Wi-Fi Alliance has been working on the so called Wi-Fi Direct and Neighbour Awareness Networking (NAN), both of which enables Device-to-Device (D2D) communication between communications devices. The NAN is sometimes also referred to as Wi-Fi Aware. In such a setting, communications devices may scan the social channels to discover other communications devices such as other wireless devices or wireless Access Points (APs). The NAN enables power efficient discovery of nearby information, such as information relating to communications devices, people, and access points, and of nearby services, by means of D2D communication. The NAN will make it easy for a user to find services available in the area that match preferences set by the user, and it is optimized to work well even in crowded environments. More details is be found at http://www.wi-fi.org/discover-wi-fi/wi-fi-aware and https://www.wi-fi.org/wi-fi-nan-technical-specification-v10 (Section 1 and 2 covers Introduction and Architecture of NAN).

A communications device capable of NAN is sometimes herein referred to as a NAN communications device or a NAN device. The NAN device may be defined as a mobile handset and/or laptop or any other communication device certified by the Wi-Fi Alliance Wi-Fi Aware program. The communication between several NAN devices is based on the IEEE 802.11n physical layer which operates at 2.4 GHz and 5 GHz carrier frequencies. The NAN is defined with a new MAC mechanisms to support a formation of a cluster, such as a cluster formation, to support master selection within a cluster, cluster discovery and acquiring synchronization within a cluster, cluster selection and merging, NAN service discovery protocol etc. The NAN protocol supports the formation of the cluster and the maintaining of a time synchronization within the cluster based on transmissions of one or more NAN synchronization beacons.

FIG. 1 schematically illustrates a communications network according to the prior art. The communications network comprises a station (STA) acting as a NAN Master, e.g. a NAN STA Master, and four stations, e.g. stations STA1-STA4. The NAN master device, i.e. the NAN device acting as the master device within a cluster, transmits one or more NAN discovery beacons, cf. FIG. 2 which will be described below, to announce the existence of the cluster to one or more neighbour communications devices, e.g. to one or more of the stations STA1-STA4, which are not part of the cluster. A cluster comprising one or more NAN devices, e.g. a NAN master device and one or more NAN slave devices, may be referred to as a NAN cluster. Further, the one or more NAN devices within the cluster transmit one or more NAN service discovery frames to either publish or subscribe to one or more services within a cluster.

As also illustrated in FIG. 1, D2D communications between the different STAs STA1-STA4 is provided in the communications network.

FIG. 2 schematically illustrates the transmissions of NAN Discovery beacons from a NAN device, e.g. the NAN STA Master of FIG. 1, to announce the existence of a cluster. Further, FIG. 2 schematically illustrates the announcing of the synchronization timing and service discovery by means of the NAN Sync beacons and the NAN Service Discovery frames, respectively.

The NAN Discovery Beacon frame is a modified IEEE 802.11 Beacon management frame transmitted outside NAN Discovery Windows to facilitate discovery of NAN clusters. Each NAN device in a master role shall transmit the NAN Discovery Beacon frames.

Further, the NAN synchronization beacon is a modified IEEE 802.11 Beacon management frame transmitted inside NAN Discovery Windows used for NAN timing synchronization.

Furthermore, the NAN Service Discovery frames enable the NAN devices to look for services from other NAN devices and to make services discoverable for other NAN devices. More details may be found in the NAN Release 1 specification: https://www.wi-fi.org/downloads-registered/Neighbor_Awareness_Networking_Technical_Specification_v1_0_0.pdf/Neighbor%2BAwareness%2BNetworking%2BTechnical%2BSpecification%2Bv1.0/29731

The NAN service discovery frame is a public action frame and it utilizes the Vendor Specific Public Action frame formats defined in the IEEE specification with the Wi-Fi Alliance Organizationally Unique Identifier (OUI) and the Wi-Fi Alliance OUI type indicating the NAN operation. As mentioned above, the NAN device transmits NAN service discovery frames to either publish or subscribe to services within a cluster.

One or more NAN Information Elements are carried in one or more NAN discovery beacon frames. The NAN Information Element is a Vendor Specific Information Element with the Wi-Fi Alliance OUI and a Wi-Fi Alliance OUI type to indicate the NAN operation. The NAN master device transmits, to one or more neighbour communications devices which are not part of the cluster, one or more NAN discovery beacons to announce the existence of the cluster.

It is envisioned that future Wi-Fi technologies may also support data transfer capability along with the existing capability to publish and/or subscribe to the services. The new technologies may support concurrent operations with other Wi-Fi or 3GPP technologies.

The 3GPP Long Term Evolution (LTE) Release 12 includes D2D communication to enable communication between nearby communications devices. Communication based on proximity between communications devices is provided using a function referred to as Proximity Services (ProSe). The ProSe comprises two types of communications.

Firstly, the ProSe comprises a direct communication between two communications devices. The direct communication is sometimes referred to as a direct mode communication. Secondly, the ProSe comprises a routed communication between two communications devices, wherein the communication is routed via the AP e.g. a base station. The routed communication is sometimes referred to as a routed mode communication or a locally routed mode communication since the AP, e.g. the base station, may be used as a relay. The ProSe is the services that may be provided by the 3GPP communications system when communications devices are located in proximity to each other. Thus, the ProSe provides the communications device, e.g. a user equipment (UE), with parameters to access the functionality, allocate and/or map application identifiers, store a reference point towards an application server, other ProSe Functions, home subscriber server (HSS) and UE. The 3GPP communications system enablers for ProSe comprise the following functions (see 3GPP TS 23.303 V13.0.0): Evolved Packet Core (EPC) level ProSe Discovery, EPC support for WLAN direct discovery and communication, Direct discovery, Direct communication, and UE-to-Network Relay.

The ProSe, see 3GPP TR 22.803 V12.2.0, assumes use cases, wherein an operator network controlled discovery and communication procedure takes place between communications devices that are located in proximity with each other, under continuous network control, and are under the 3GPP network coverage, for:
1. Commercial and/or social use
2. Network offloading
3. Public Safety
4. Integration of current infrastructure services, to assure the consistency of the user experience including reachability and mobility aspects.

Additionally, the use cases comprise:
5. Public Safety, in case of absence of the E-UTRAN coverage. This may be subject to regional regulation and operator policy, and limited to specific public-safety designated frequency bands and terminals.

Details on the ProSe, based on 3GPP TR 22.803 V12.2.0, will be described below.

Data Paths for the ProSe Communications

As currently specified, a default data path scenario is when two communications devices located in proximity, e.g. close proximity, with each other are communicating, and their data path, e.g. their user plane data path, goes via the operator's communications network. By the expression "close proximity" when used in this disclosure is meant that two communications devices are able to send and receive data, signals and/or beacons to and from each other. When the expression "close proximity" is used for ProSe it means that the two communications devices are within the same cellular cell coverage or within the same geographical neighbourhood. Further, when the expression "close proximity" is used for WLAN NAN it means that the communications devices are located within the range of the WLAN i.e. in the order of tens or hundreds of meter. The typical data path for ProSe communication is shown in FIG. 3, wherein the communication between a first communications device denoted UE1 and a second communications device denoted UE2 goes via a respective base station denoted eNB1 and eNB2, respectively, and via a Serving Gateway (SGW) or a Public Data Network (PDN) Gateway (PGW) of e.g. a core network.

In a ProSe communication scenario, when two communications devices are located in proximity with each other, they may be able to use a direct mode communications path or a locally-routed communications path.

For example, in a 3GPP LTE spectrum, the operator may move the data path, e.g. the user plane data path, off the access network and the core network onto one or more direct links between the communications devices. FIG. 4 schematically illustrates a direct mode data path in the communications network, e.g. in an Evolved Packet System (EPS), for communication between the first communications device UE1 and the second communications device UE2.

Another example is when the data path is locally-routed via one or more of the base stations, e.g. the first base station eNB1 and/or the second base station eNB2. FIG. 5 schematically illustrates a locally-routed mode data path in the communications network, e.g. the EPS, for communication between the first communications device UE1 and the second communications device UE2 when both communications devices UE1, UE2 are served by the first base station eNB1.

Control Paths for the ProSe Communication

For the ProSe Communication scenarios depicted in FIG. 4 and FIG. 5, several control path scenarios may apply. Examples of potential control paths for different situations will be described below with reference to FIGS. 6-8.

FIG. 6 schematically illustrates an example control path for network-supported ProSe communication between the first and second communications devices UE1, UE2 when being served by the same base station, e.g. the first base station eNB1.

When the first and second communications devices UE1, UE2 involved in the ProSe Communication are served by the same base station, e.g. the base station eNB1 as illustrated in FIG. 6, and network coverage is available, the system, e.g. a core network node or a base station, may decide to perform ProSe Communication using control information exchanged between the respective communications device UE1, UE2, the serving base station, e.g. the base station eNB1, and the core network, e.g. an Evolved Packet Core (EPC), as shown by the solid arrows in FIG. 6. For example, the control information exchanged may relate to session management, authorization, and/or security. For charging, signalling modifications should be minimized with respect to the existing architecture. The communications devices UE1, UE2 may in addition exchange control signalling via the ProSe Communication path as shown by the dashed arrow in FIG. 6.

FIG. 7 schematically illustrates an example control path for network-supported ProSe communication for the first and second communications devices UE1, UE2 when being served by different base stations, e.g. by the first base station eNB1 and the second base station eNB2, respectively.

When the first and second communication devices UE1, UE2 involved in the ProSe communication are served by different base stations, e.g. by the first and second base stations eNB1, eNB2, respectively, and when network coverage is available, the system, e.g. the core network node or the base station, may decide to perform the ProSe Communication using control information exchanged between the respective communications device UE1, UE2, the respective base station eNB1, eNB2, and the core network, e.g. the EPC, as shown by the solid arrows in FIG. 7. In this configuration, the first and second base stations eNB1, eNB2 may coordinate with each other through the EPC or communicate directly for radio resource management as shown by the dashed arrow between the eNBs in FIG. 7. For charging, signalling modifications should be minimized with respect to the existing architecture. The first and second communication devices UE1, UE2 may in addition exchange control signalling via the ProSe Communication path as shown by the dashed arrow between the first communications device UE1 and the second communications device UE2 in FIG. 7.

If network coverage is available to a subset of the communications devices comprised in the communications network, one or more Public Safety communications devices may relay radio resource management control information for communications devices that do not have network coverage. By the expressions "Public Safety communications device" and "Public Safety UE" when used in this disclosure is meant a communications device, e.g. a UE, that the Home Public Land Mobile Network (HPLMN) has configured to be authorized for Public Safety use, and which is ProSe-enabled and supports ProSe procedures and capabilities specific to Public Safety. The UE may, but need not, have a Universal Subscriber Identity Module (USIM) with one of the special access classes {12, 13, 14}. Further, the expressions "Public Safety communications device" and "Public Safety UE" are used interchangeably in this disclosure.

FIG. 8 schematically illustrates an example control path for Public Safety ProSe communication for the first and second communications devices UE1, UE2 without network support, e.g. without support from the communications network.

When network coverage is not available, the control path may exist directly between Public Safety UEs, e.g. between the first communications device UE1 and the second communications device UE2 when they are public safety UEs, as shown with the solid arrow in FIG. 8. In this configuration, the Public Safety UEs may rely on pre-configured radio resources to establish and maintain the ProSe Communication. Alternatively, a Public Safety Radio Resource Management Function, e.g. a Public Safety Radio Resource Controller, which may reside in another Public Safety UE, e.g. a third communications device UE3, may manage the allocation of radio resources for Public Safety ProSe Communication between the first and second communications devices UE1, UE2 as shown with the dashed arrows in FIG. 8.

LTE ProSe Discovery

A ProSe discovery process identifies that a first ProSe-enabled communications device is in proximity of a second ProSe-enabled communications device. By the expression "ProSe-enabled communications device" when used in this disclosure is meant a communications device enabled for ProSe communication, e.g. a communications device capable of ProSe communication. The ProSe discovery process uses an Evolved Universal Terrestrial Radio Access (E-UTRA), e.g. with or without an E-UTRA Network (E-UTRAN), or the EPC and comprises two discovery models. The first model is referred to as Model A and involves one communications device announcing "I am here" and the second model referred to as Model B involves one communications device asking "who is there" and/or "are you there", see 3GPP TS 23.303 V13.0.0.

The LTE ProSe versus the IEEE NAN

While the IEEE NAN is targeting the use cases of social gaming, music sharing, group chatting, friend finder, home appliances control etc. promising affordable access to lots of different types of communications devices, the LTE ProSe is designed with the requirements of public safety and commercial consumer applications in mind and evolving toward a wider range of applications such as vehicle-to-infrastructure (V2X) communications, e.g., Vehicle-to-Vehicle (V2V) communications (see RP-151109 Feasibility Study on LTE-based V2X Services) or other latency- and reliability-demanding applications. Differences in the technologies and the targeted applications may mean that the IEEE NAN and the LTE ProSe may be preferable for different type of communication needs even if it is a part of the same commercial application.

Enabling or disabling the LTE ProSe may be subject to the user and/or operator preferences (ETSI TS 122.278 Section 7A.1). Similarly, the IEEE NAN is also expected to be either enabled or disabled by the user similarly to its predecessor Wi-Fi Direct, which is already deployed, as a part of mobile handsets and other portable devices. User preference on selecting the IEEE NAN and/or the LTE ProSe may be based on associated monetary cost, power consumed by the respective radio links, user perception and/or user choice about preferred radio technologies, etc. This means that even if the communications devices support both technologies, these technologies may not always be active simultaneously.

Mobile handsets supporting the IEEE NAN Release 1 are expected to be out in the market by end of 2015. The LTE ProSe functionality will be offered by the network operator and it is expected that the first release will include the support of the ProSe services within the network operator and not across operators, which will limit the number of services that may be offered by the LTE ProSe, as compared to services that may be offered by the NAN across operators.

Also, it is expected that, the NAN services being offered using unlicensed spectrum will continue to be free of cost. On the contrary, the LTE ProSe, at least for the initial phase, is expected to use licensed spectrum of the operator network. In this case, users need to pay for the ProSe. This may result in more services that are being offered within the NAN, as compared to the number of services being offered by the LTE ProSe.

Furthermore, the NAN based D2D communication is limited by lesser mobility, and by the dependence on the link quality in the unlicensed spectrum. On the contrary, the LTE based ProSe offers wider and more reliable access to the proximity service, mobility within and across cells and communication in the licensed spectrum, yet, as mentioned, still with some cost and constraints due to the potential operator involvement.

Research into discovering the neighbour devices is currently being conducted within the single radio access technology e.g. within the Wi-Fi and within the 3GPP.

The IEEE Pre-Association Discovery Procedures

One of the amendments to the IEEE 802.11 standard defines a pre-association discovery protocol that may be used between the communications device, e.g. a wireless station (STA), and an Access Point (AP) for service advertisement and service discovery. The standardization is ongoing within the IEEE 802.11 Task Group aq (TGaq). The TGaq has specified a mechanism by which the STA and the AP may advertise and discover services in a pre-association state without the need to carry lengthy association and authentication procedures, which results in low latency for the discovery of the service. FIG. 9 schematically illustrates frame exchange for the pre-association service discovery procedure.

The AP advertises, in Action 901, a Service Hash element in one or more Beacon frames that it sends out periodically. The Service Hash element carries hashed information on all the services that are supported by a Basic Service Set (BSS) served by the AP. When a communications device, e.g. a STA, reads the Service Hash element, it tests, in Action 902, whether the service it is interested in is present in the hash by for example using a Bloom filter mechanism of testing for a false positive match. The Bloom Filter provides a probabilistic representation of an available set of services in the BSS or in an external network reachable via the BSS. If the communications device, e.g. the STA, determines that the probability of the service being present in the hash is rather large, the STA queries, in Action 903, further information from the AP via a Probe Request frame, indicating the particular service, e.g. a service named Y as indicated in FIG. 9, that is being queried for. The AP then provides, in Action 904, additional information, e.g. in a Probe Response, on that particular service. In response to the received additional information, the STA transmits, in Action 905, to the AP, a Pre Association Discovery (PAD) Service Information (SI) Request comprising the service name Y and an SI Query Request. The PAD is a discovery service provided to allow non-AP STAs, in a pre-association state, to discover information concerning services that are offered by a Primary BSS (PBSS), a BSS or an external network. This information may allow a STA to choose during network selection, which PBSS or BSS, e.g. which communications network, to associate with to obtain services. The AP may transmit, in Action 906, to the STA, a PAD Service Information Response comprising the service name Y and a SI Query Response. Thereafter, in Action 907, an association procedure is accomplished between the STA and the AP.

A drawback with the prior art is that when two or more RATs are available it may be difficult for a communications device to decide which RAT is the best RAT to use.

A further drawback with the prior art IEEE 802.11 NAN and 3GPP LTE ProSe technologies is that they are specified by different standardization bodies with major differences in terms of targeted use cases and services, as well as in terms of technical aspects, which may affect the user experience.

SUMMARY

An object of embodiments herein is to address at least some of the above-mentioned drawbacks among others and to improve the performance in a communications network.

According to one aspect of embodiments herein, the object is achieved by a method performed by a first communications device for Device-to-Device (D2D) communication with a second communications device using a first Radio Access Technology (RAT) or a second RAT. The first and second communications devices are operating in a communications network.

By means of the first RAT, the first communications device transmits, to the second communications device, information relating to a proximity service provided by the second RAT. Thereby the information enables the second communications device to determine whether to use the first RAT or the proximity service provided by the second RAT for D2D communication with the first communications device.

According to another aspect of embodiments herein, the object is achieved by a first communications device for Device-to-Device (D2D) communication with a second communications device using a first Radio Access Technology (RAT) or a second RAT. The first and second communications devices are operating in a communications network.

The first communications device is configured to, by means of the first RAT, transmit, to the second communications device, information relating to a proximity service provided by the second RAT. Thereby the information enables the second communications device to determine whether to use the first RAT or the proximity service provided by the second RAT for D2D communication with the first communications device.

According to another aspect of embodiments herein, the object is achieved by a method performed a method performed by a second communications device for Device-to-Device (D2D) communication with a first communications device using a first Radio Access Technology (RAT) or a second RAT. The first and second communications devices are operating in a communications network.

By means of the first RAT, the second communications device receives, from the first communications device, information relating to a proximity service provided by the second RAT.

Further, the second communications device determines whether to use the first RAT or the proximity service provided by the second RAT.

Furthermore, the second communications devices applies the determined first RAT or proximity service provided by the second RAT for D2D communication with the first communications device.

According to another aspect of embodiments herein, the object is achieved by a second communications device for Device-to-Device (D2D) communication with a first communications device using a first Radio Access Technology (RAT) or a second RAT. The first and second communications devices are operating in a communications network.

The second communications device is configured to, by means of the first RAT, receive, from the first communications device, information relating to a proximity service provided by the second RAT.

Further, the second communications device is configured to determine whether to use the first RAT or the proximity service provided by the second RAT.

Furthermore, the second communications device is configured to apply the determined first RAT or proximity service provided by the second RAT for D2D communication with the first communications device.

According to another aspect of embodiments herein, the object is achieved by a computer program, comprising instructions which, when executed on at least one processor, causes the at least one processor to carry out the method performed by the first communications device.

According to another aspect of embodiments herein, the object is achieved by a computer program, comprising instructions which, when executed on at least one processor, causes the at least one processor to carry out the method performed by the second communications device.

According to another aspect of embodiments herein, the object is achieved by a carrier comprising the computer program, wherein the carrier is one of an electronic signal, an optical signal, a radio signal or a computer readable storage medium.

Since the first communications device, by means of the first RAT, transmits, to the second communications device, information relating to a proximity service provided by the second RAT, the second communications device is enabled to determine whether to use the first RAT or the proximity service provided by the second RAT for D2D communication with the first communications device. Thereby, the D2D communication in the communications network is improved. This results in an improved performance in the communications network.

An advantage with embodiments herein is that they provide interoperability between D2D communication using a first RAT, e.g. a WLAN technology, such as the IEEE 802.11 NAN technology, and a second RAT, e.g. a 3GPP LTE technology, such as the 3GPP LTE ProSe.

Another advantage with embodiments herein is that the D2D communications is enabled with minimal overhead, whereby an efficient mobility support may be provided. Further, an enhanced throughput, e.g. via aggregation, and an enhanced reliability and application availability may be provided.

Another advantage with embodiments herein is that unnecessary and/or lengthy series of signalling for a ProSe discovery and connection setup is avoided or at least reduced. This may be beneficial especially when the two communications devices are from different operators.

Yet another advantage with embodiments herein is the mobility between the IEEE NAN and the LTE ProSe which extends the coverage of the offered services.

BRIEF DESCRIPTION OF DRAWINGS

Examples of embodiments herein are described in more detail with reference to attached drawings in which:

FIG. 14 is a flowchart schematically illustrating embodiments of a method performed by a second communications device;

FIG. 16 schematically illustrates embodiments of a NAN service discovery frame format comprising an LTE ProSe capability attribute;

FIG. 17 schematically illustrates embodiments of a NAN synchronization and NAN discovery beacon frame format comprising an LTE ProSe capability attribute.

DETAILED DESCRIPTION

Figure 1:
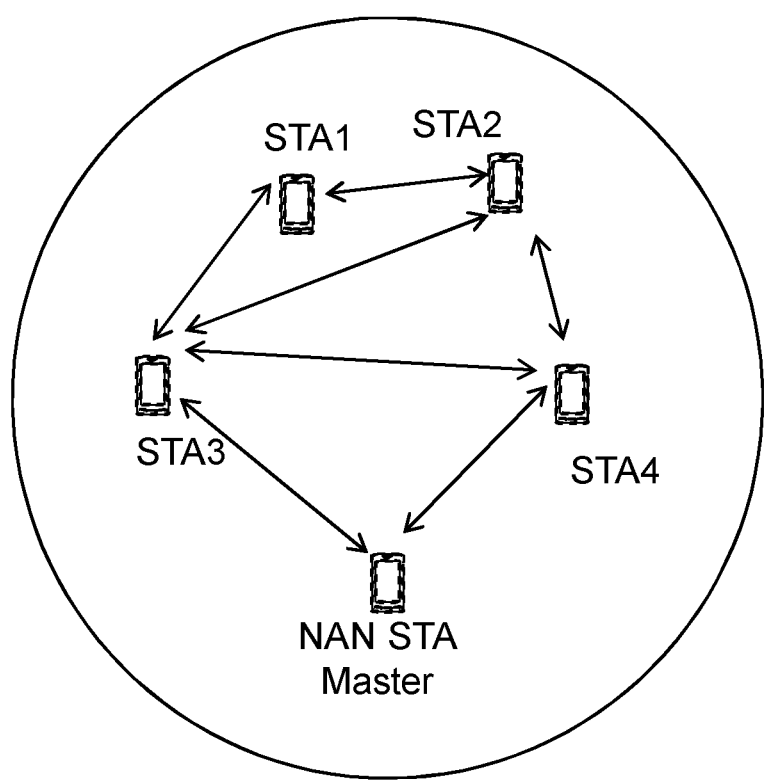
FIG. 1 schematically illustrates a communications network according to the prior art.
Figure 2:
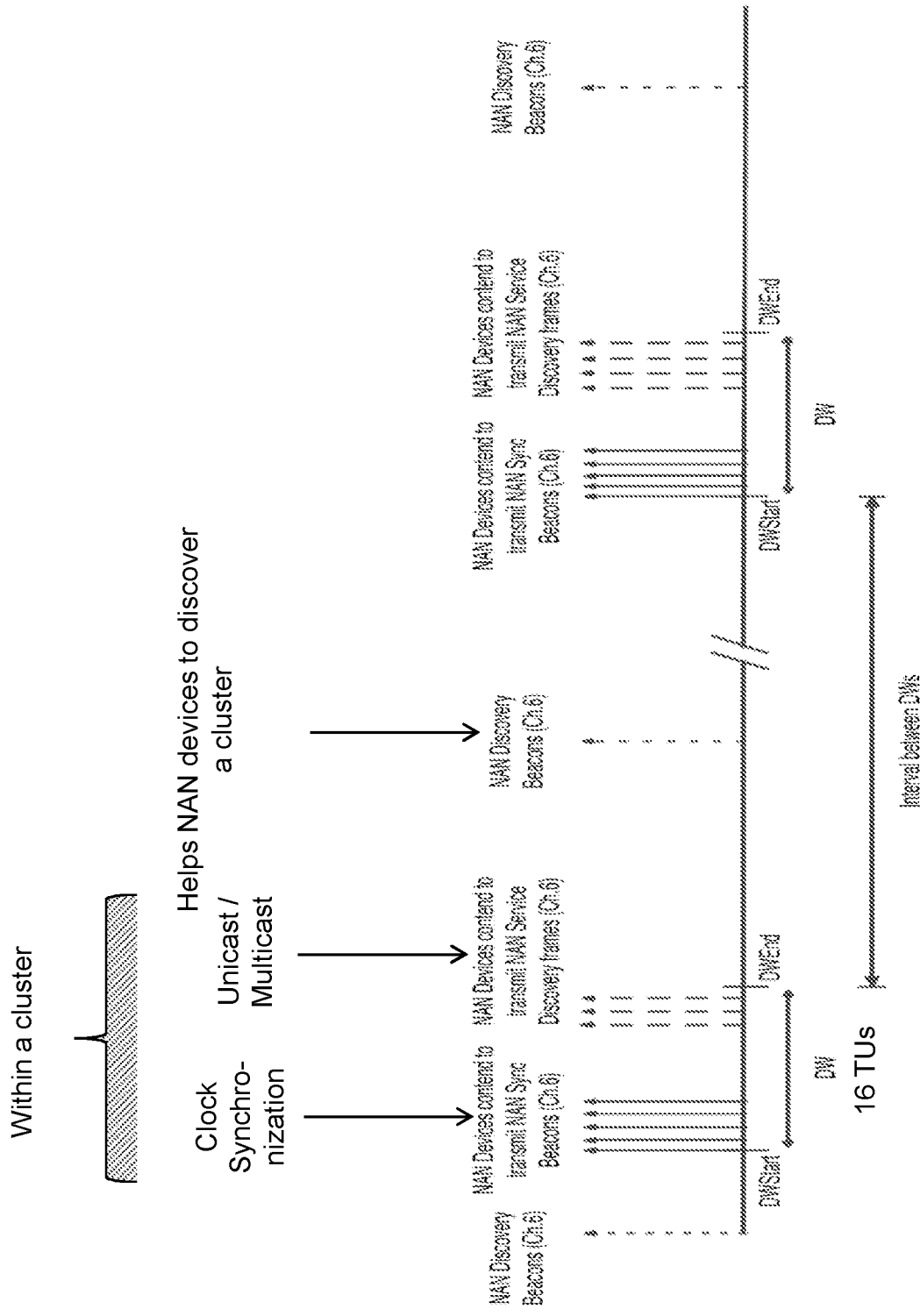
FIG. 2 schematically illustrates signals transmitted in a communications network according to the prior art.
Figure 3:
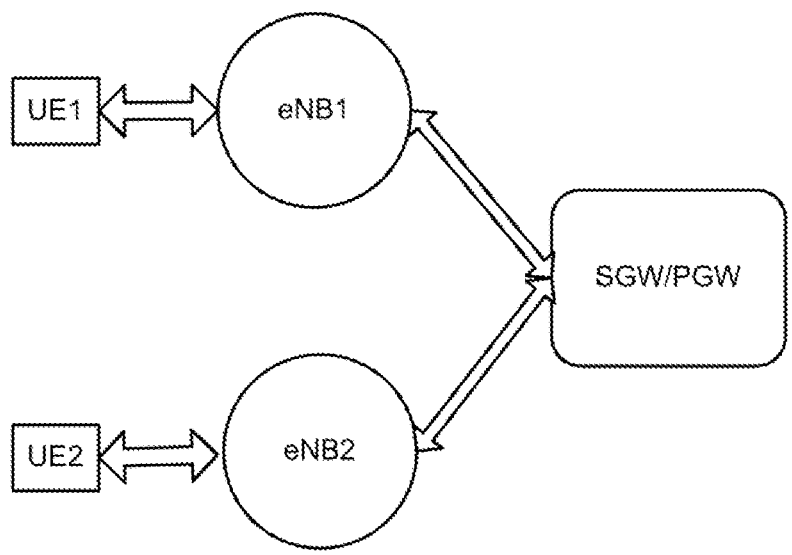
FIG. 3 schematically illustrates a default data path scenario in a communications network according to the prior art.
Figure 4:
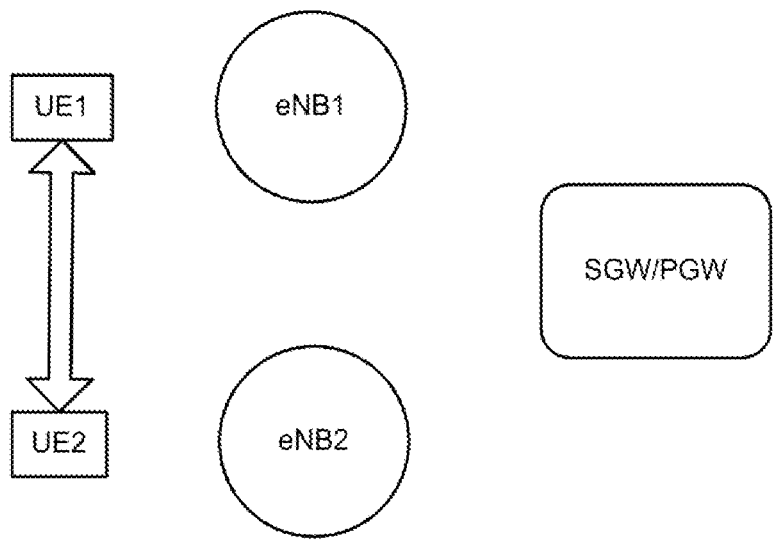
FIG. 4 schematically illustrates a direct mode data path scenario in a communications network according to the prior art.
Figure 5:
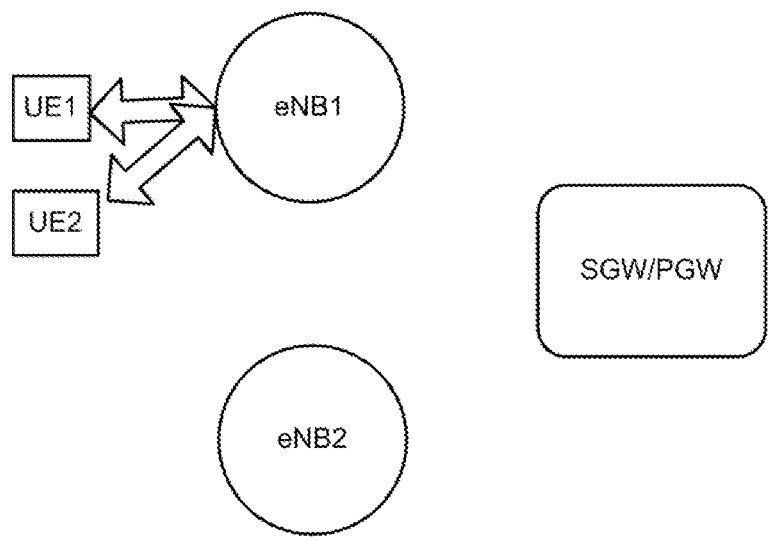
FIG. 5 schematically illustrates a locally-routed data path scenario in a communications network according to the prior art.
Figure 6:
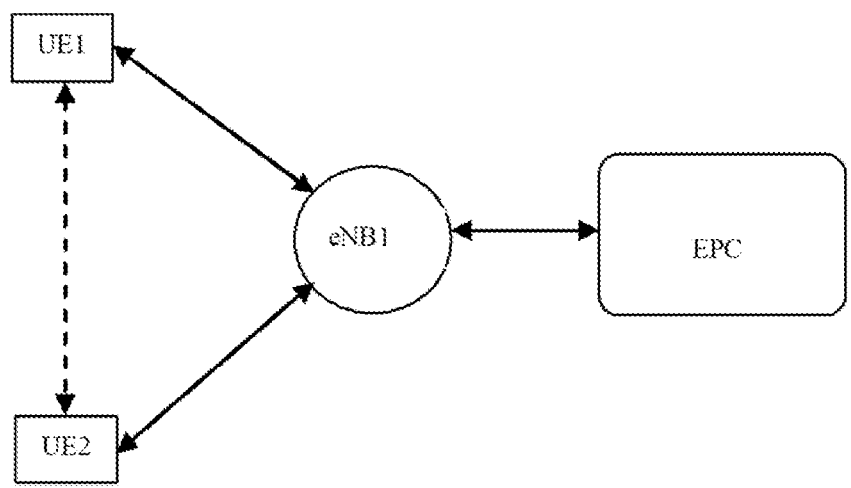
FIG. 6 schematically illustrates a prior art control path scenario for network supported ProSe communication between communications devices served by the same base station.
Figure 7:
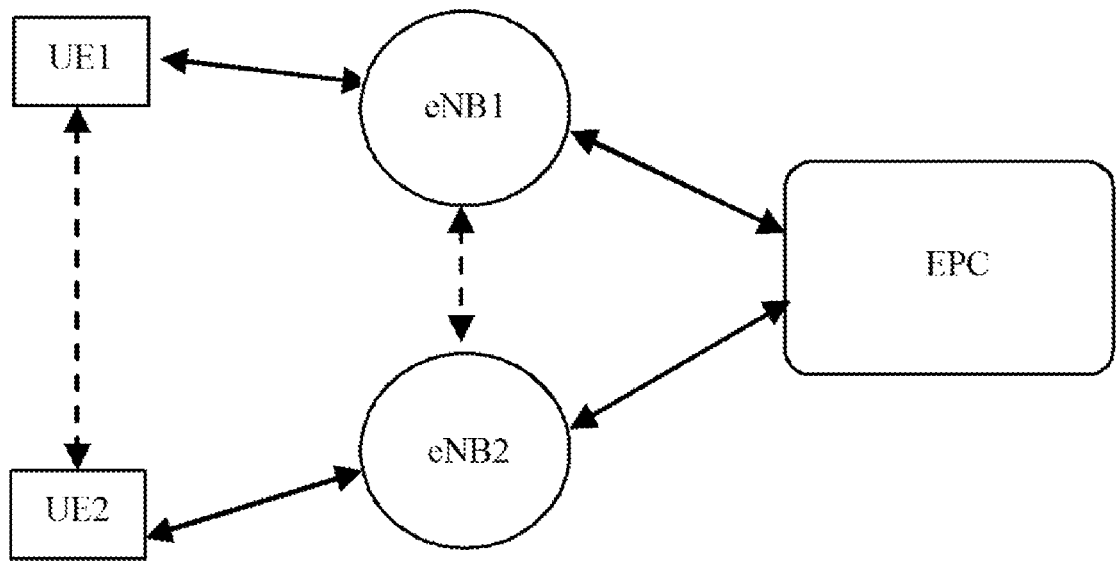
FIG. 7 schematically illustrates a prior art control path scenario for network supported ProSe communication between communications devices served by different base stations.
Figure 8:
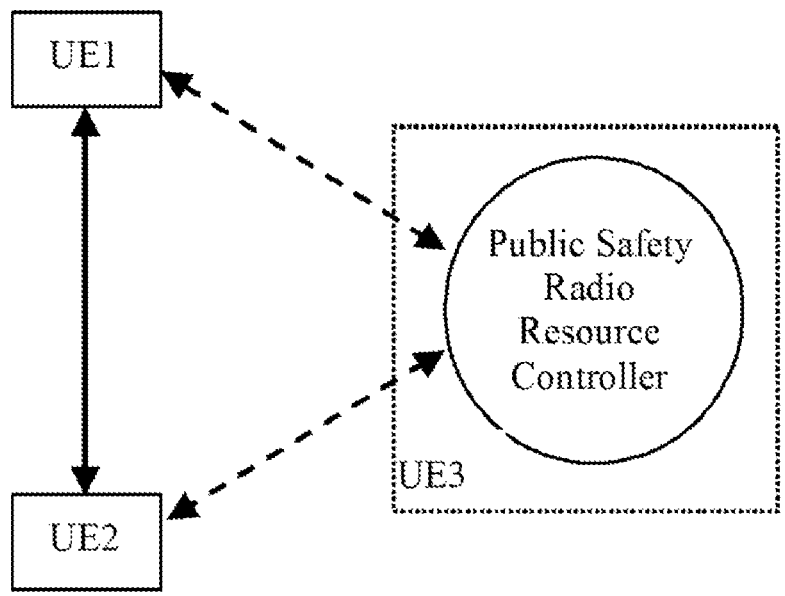
FIG. 8 schematically illustrates a prior art control path scenario for ProSe communication between communications devices without network support.
Figure 9:
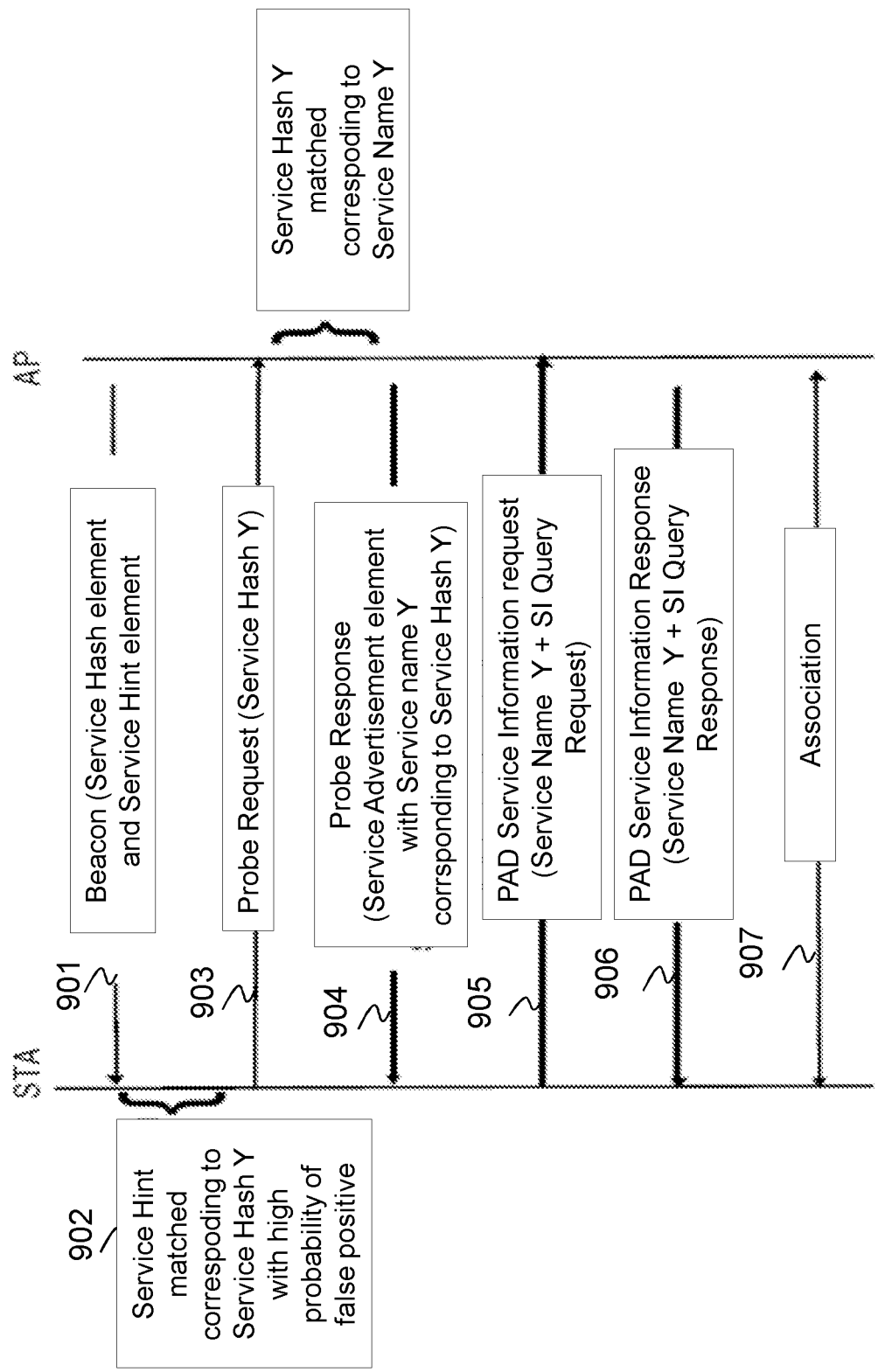
FIG. 9 schematically illustrates a prior art frame exchange for pre-association service discovery.

As part of developing embodiments herein, some problems with the state of the art communications networks will first be identified and discussed.

As previously mentioned, research into discovering the neighbour communications devices is currently being conducted within each single radio access technology e.g. within the WLAN and within the 3GPP communications network. However, research into proximity service communication in heterogeneous communications networks has not been sufficiently conducted. There lie opportunities to make the IEEE 802.11 NAN inter-operate with the LTE ProSe and vice versa.

Further, as also mentioned above, a drawback with the existing solution is that it is the IEEE 802.11 NAN technology and the 3GPP LTE ProSe technology are specified by different standardization bodies with major differences in terms of targeted use cases and services, as well as in terms of technical aspects. The work that has been done so far does not address the interoperability across technologies sufficiently, even though it could be beneficial to enhance the user experience.

According to the current specifications, the IEEE NAN and the LTE ProSe technologies work independently not allowing smart activation, handover or aggregation with a defined inter-operability features.

A problem addressed by embodiments herein is therefore how to provide an improved D2D communication between two communications devices operating in a communications network, e.g. an heterogeneous communications network.

Therefore, as mentioned above, according to embodiments herein, a way of improving the performance in a wireless communications network is provided.

In order to overcome the above-mentioned drawback and to provide a solution to the above-mentioned problem, a first communications device capable of D2D communication using a first RAT or a second RAT is provided. By means of the first RAT, the first communications device transmits, to a second communications device, information relating to a proximity service provided by the second RAT. Thereby the information enables the second communications device to determine whether to use the first RAT or the proximity service provided by the second RAT for D2D communication with the first communications device.

Note that although terminology from the IEEE 802.11 and the 3GPP LTE is used in this disclosure to exemplify the embodiments herein, this should not be seen as limiting the scope of the embodiments herein to only the aforementioned systems. Other non-cellular and cellular wireless systems, including WLAN, Wideband Code Division Multiple Access (WCDMA), Worldwide Interoperability for Microwave Access (WiMax), Ultra Mobile Broadband (UMB), Global System for Mobile Communications (GSM), and Internet of Thing (IoT) technologies such as Bluetooth, LoRa, Sigfox, IEEE 802.15.4, and Narrowband-LTE may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 10:
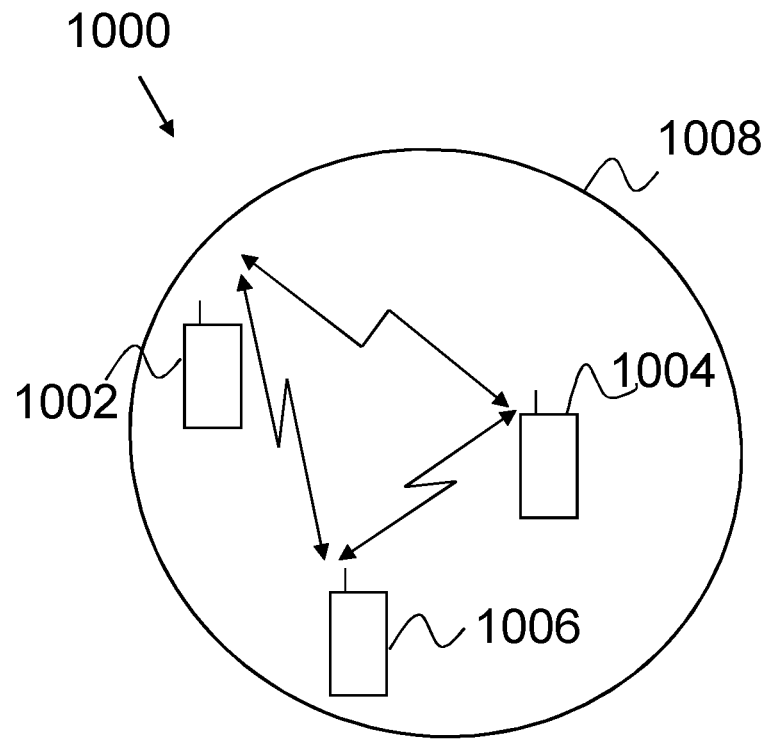
FIG. 10 schematically illustrates embodiments of a communications network.

Embodiments herein may be implemented in a communications network 1000 as schematically illustrated in FIG. 10. The communications network 1000 is a heterogeneous communication network, e.g. within the communications network 1000 communication using a first RAT and/or a second RAT is enabled. Further, the communications network may be a wireless communications network.

The first RAT is a non-cellular network technology.

In some first embodiments described herein, the first RAT is a non-cellular network technology supporting D2D communication, such as a WLAN technology supporting D2D communication. It should be understood that the WLAN technology supporting D2D communication described herein may be a NAN technology, a WiFi direct technology or another suitable WLAN technology supporting D2D communication.

In some second embodiments, the first RAT is a non-cellular network technology supporting pre-association discovery such as the WLAN technology supporting pre-association discovery.

The second RAT is a cellular network technology supporting the proximity service such as the 3GPP cellular network ProSe technology. It should also be understood that the cellular network technology supporting the proximity service described herein may be a network technology based on UTRAN, E-UTRAN, Next generation (NX), etc., or another suitable 3GPP network technology supporting the proximity service.

A first communications device 1002 and a second communications device 1004 are operating in the communications network 1000. Further, a third communications device 1006 may be operating in the communications network 1000. The first, second and possible also the third communications devices 1002, 1004, 1006 are located in proximity, e.g. in close proximity, with each other. Thus, they are located within in a distance from each other so that a transmission from one of them, e.g. the first communications device 1002, is reachable for another one of them, e.g. the second communications device 1004 or the third communications device 1006.

The first communications device 1002 is configured to operate in both the first and the second RAT. The second communications device 1004 is configured to operate in the first RAT. Further, the second communications device 1004 may be configured to also operate in the second RAT. The third communications device 1006 is configured to operate in at least one of the first and second RATs.

Sometimes in this disclosure, the first, second and third communications devices 1002, 1004, 1006 are comprised in the communications network 1000.

The first communications device 1002 may be a station (STA) or an Access Point (AP). The second communications device 1004 and the third communications device 1006 may be an STA.

In some embodiments the non-limiting terms station (STA) or user equipment (UE) is used interchangeably. Examples of UEs are target devices, Device-to-Device UEs, machine type UEs or UEs capable of machine to machine communication, Personal Digital Assistants (PDA), iPADs, Tablets, mobile terminals, wireless terminals, smart phones, Laptop Embedded Equipped (LEE), Laptop Mounted Equipment (LME), USB dongles, sensors etc. In this disclosure the term UE used in this disclosure also covers other devices such as Machine Type of Communication (MTC) device, an Internet of Things (IoT) device, e.g. a Cellular IoT (CIoT) device, an LTE MTC device or a Narrowband IoT device, even though they do not have any user.

In some embodiments the non-limiting term AP is used. Examples of APs are radio access nodes such as radio base stations, for example eNodeBs, also denoted eNBs, Home eNodeBs, or NodeBs or any other access node capable to serve a wireless device when located within a geographical area 1008 in a wireless communications network, such as the communications network 1000. Herein, this is also specified as the AP manages or is configured to manage communication with one or more wireless devices in the geographical area 1008. Further, in this disclosure, the geographical area 1008 is sometimes referred to as a coverage area, a cell or a cluster.

Figure 11:
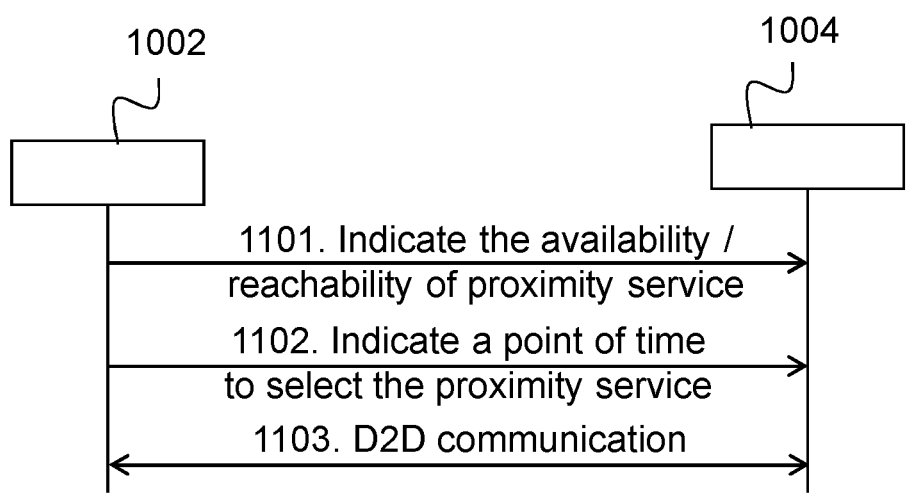
FIG. 11 schematically illustrates signalling between a first communications device and a second communications device according to embodiments.

FIG. 11 schematically illustrates an exemplifying signalling scheme between the first communications device 1002 and the second communications device 1004 for enabling D2D communication between them.

In Action 1101, the first communications device 1002 indicates by means of the first RAT, to the second communications device 1004, an availability or a reachability of a proximity service provided by the second RAT.

Further, in Action 1102, the first communications device 1002 may indicate by means of the first RAT, to the second communications device 1004, a point in time when the proximity service provided by the second RAT is available or reachable.

In Action 1103, a D2D communication is set up between the first communications device 1102 and the second communications device 1004 by means of the first RAT or the proximity service provided by the second RAT.

Figure 12:
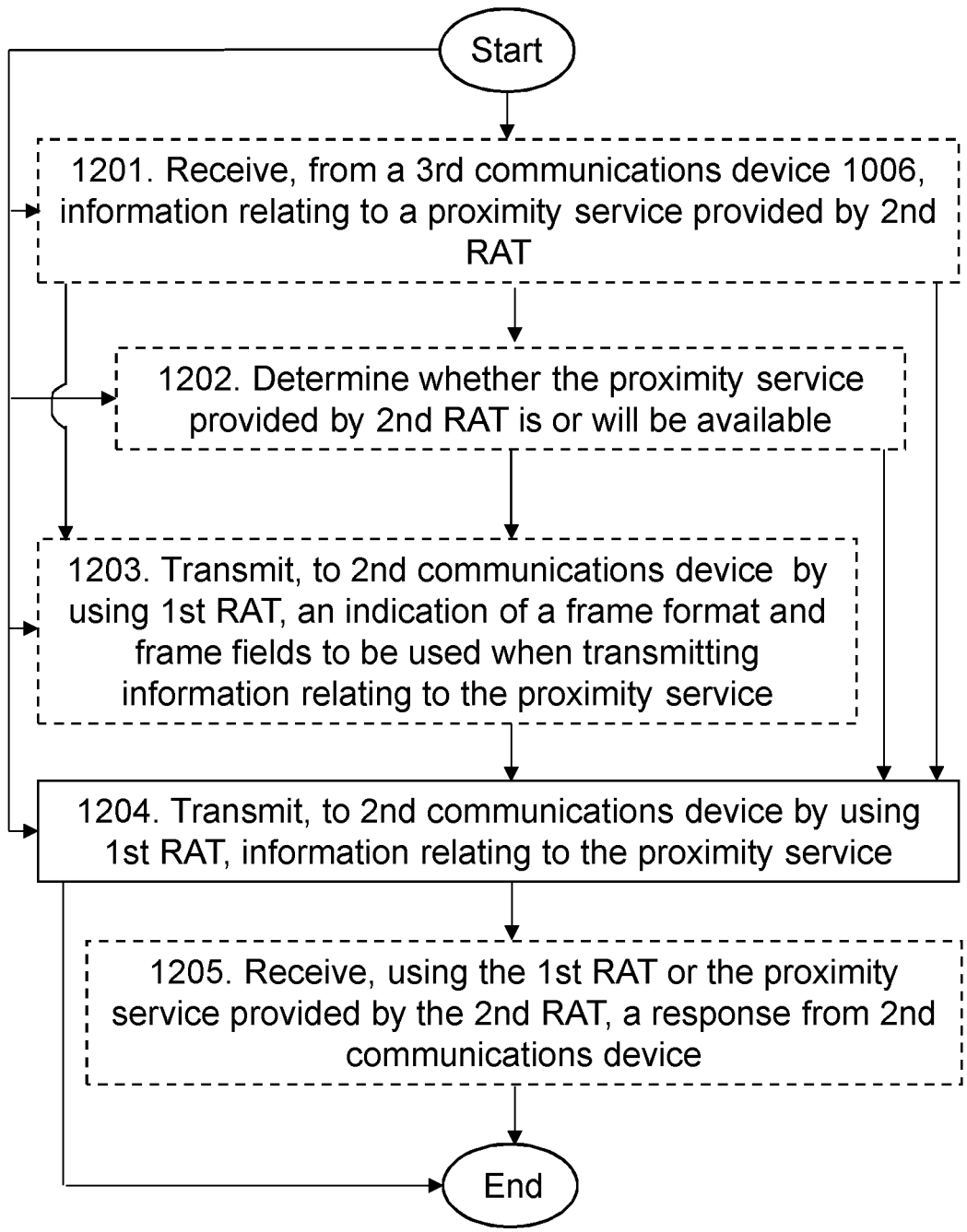
FIG. 12 is a flowchart schematically illustrating embodiments of a method performed by a first communications device.

Examples of methods performed by the first communications device 1002 for D2D communication with the second communications device 1004 using the first RAT or the second RAT will now be described with reference to flowchart depicted in FIG. 12. The first and second communications devices 1002,1004 are operating in the communications network 1000. The methods comprise one or more of the following actions. It should be understood that these actions may be taken in any suitable order and that some actions may be combined.

As previously mentioned, in some first embodiments, the first RAT is the non-cellular network technology supporting D2D communication, such as the WLAN technology supporting D2D communication, and the second RAT is the cellular network technology supporting the proximity service such as the 3GPP cellular network ProSe technology.

It should be understood that the WLAN technology supporting D2D communication described herein may be a NAN technology, a WiFi direct technology or another suitable WLAN technology supporting D2D communication.

It should also be understood that the cellular network technology supporting the proximity service described herein may be a network technology based on UTRAN, E-UTRAN, Next generation (NX), etc., or another suitable cellular network technology supporting the proximity service.

As also previously mentioned, in some second embodiments, the first RAT is the non-cellular network technology such as the WLAN technology supporting pre-association discovery, and the second RAT is the cellular network technology supporting the proximity service such as the 3GPP cellular network ProSe technology.

Action 1201

In some second embodiments, the first communications device 1002 receives, from the a communications device 1006, information relating to the proximity service provided by the second RAT. This may be the case when the first communications device 1002 is an AP, and the AP receives information about the proximity service provided by the second RAT from the third communications device 1006 operating in the communications network. Thereby, the first communications device 1002, e.g. the AP, is able to advertise the proximity service related to the third communications device 1006 to the second communications device 1004. This will be described below in Action 1004.

Action 1202

In some embodiments, the first communications device 1002 determines whether the proximity service provided by the second communications device 1004 is or will be available. This may for example be the case when the proximity service is an intermittent service provided or enabled at certain points in time or in certain periods in time, and therefore it may be desirable to determine whether the proximity service is or will be available.

Further, the information relating to the proximity service may comprise a time indication indicating a point in time when the proximity service provided by the second RAT is or will be available.

In some embodiments, the information relating to the proximity service comprises control information of the proximity service. The information relating to the proximity service may comprise one or more attributes of the second RAT including one or more of: configuration parameters, an identifier of an operator, an identifier of the first communications device 1002, a radio frequency for the operation of the proximity service, a point of time for the proximity service, information relating to termination of an ongoing service that should be stopped before the proximity service is started, and a quality of service for the proximity service.

Further, the information relating to the proximity service may comprise a link indication indicating whether to use an existing communications link of the first RAT or a new communications link of the second RAT. An example of an existing communications link of the first RAT is a Wifi NAN radio link and an example of the new communications link of the second RAT is a 3GPP LTE ProSe link.

The information may be encrypted information. For example, the information may be encrypted using existing security material, e.g. security keys, of the second RAT.

Action 1203

In some first embodiments, the first communications device 1002 transmits to the second communications device 1004, by means of the first RAT, an indication of a frame format and of one or more frame fields to be used when transmitting the information relating to the proximity service. Thereby, the first communications device 1002 will inform the second communications device 1004 about the frame format and frame fields to receive and process in order to acquire the information relating to the proximity service.

The frame format may be or may comprise a format of one or more of: a NAN service discovery frame, a NAN discovery beacon frame, an Action frame, or a Beacon frame. Further, the one or more frame fields are one of more frame fields within which the proximity service information is carried when the proximity service is or will be available for use.

Action 1204

By means of the first RAT, the first communications device 1002 transmits, to the second communications device 1004, information relating to a proximity service provided by the second RAT. Thereby, the second communications device 1004 receives information about the proximity service provided by the second RAT. Based on that information the second communications device 1004 to determine whether to use the first RAT or the proximity service provided by the second RAT for D2D communication with the first communications device 1002.

The first communications device 1002 may transmit the information relating to the proximity service via the indicated frame format and fields.

In some first embodiments, the first communications device 1002 transmits the information in a management frame such as a beacon frame, in a control frame, in a data frame such as an action frame, in a service discovery frame, in a discovery beacon frame, or in a control signalling frame. It should be understood that the information may be transmitted over different frames at the same time, since the first communications device 1002 may use different types of signalling simultaneously. Thus, the first communications device 1002 may select the frame to transmit the information in based on one or more of the different types of signalling.

Further, in some first embodiments, the first communications device 1002 transmits the information using unicast, multicast or broadcast. Thus, the first communications device 1002 may transmit the information to a single second communications device 1004 or to a plurality of second communications devices 1004.

In some second embodiments, the first communications device 1002 transmits the information in a pre-association signal, a beacon signal or in a probe response signal. The pre-association signal may comprise one or more Generic Advertisement Service, (GAS) frames, one or more Access Network Query Protocol (ANQP) frames, or one or more ANQP-Service Discovery (ANQP-SD) frames.

Action 1205

In some first embodiments, the first communications device 1002 receives, by means of the first RAT or the proximity service provided by the second RAT, a response from the second communications device 1004, which response comprises information relating the proximity service provided by the second RAT. Thereby, the first communications device 1002 receives information about the proximity service provided by the second RAT and about the second RAT.

Thus, in response to first information relating to a proximity service provided by the second RAT transmitted from the first communications device 1002 using the first RAT to the second communications device 1004 as described in Action 1204, the second communications device 1004 responds by transmitting second information relating to the proximity service provided by the second communications device 1004. The second information may be transmitted using the first or the second RAT. In Action 1205, the first communications device 1002 receives the transmitted second information.

Based on the received second information, the first and second communications devices 1002,1004 may agree on communicating using the second RAT at a specific time frame in the future. Alternatively or additionally, the first and second communications device 1002,1004 may agree on stopping to use the first RAT, or they may agree on continue communicating using both the first RAT and the second RAT.

Figure 13:
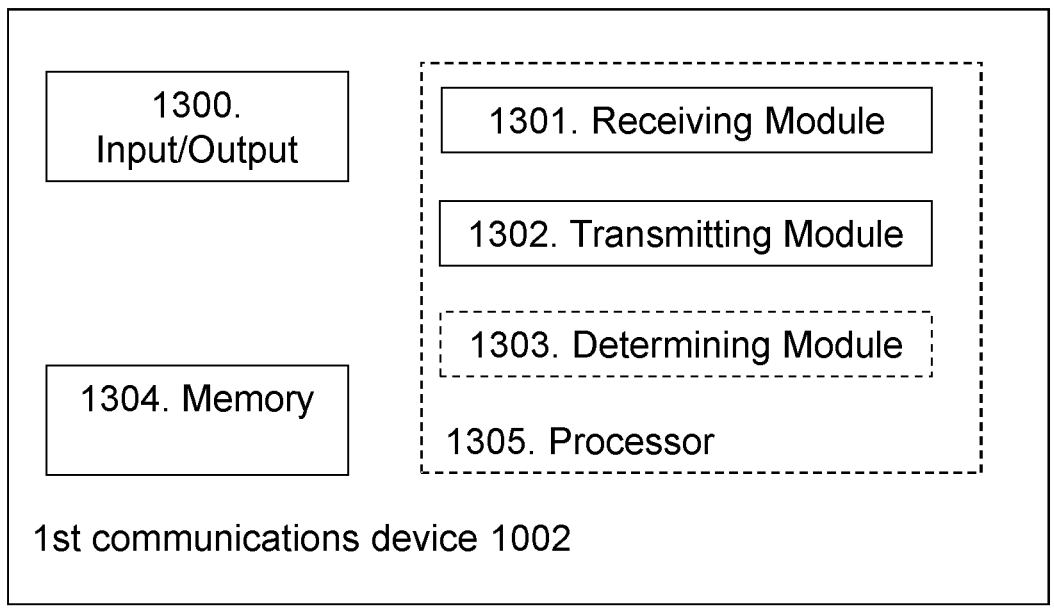
FIG. 13 is a block diagram schematically illustrating embodiments of a first communications device.

To perform the method for D2D communication with the second communications device 1004 using the first RAT or the second RAT, the first communications device 1002 may be configured according to an arrangement depicted in FIG. 13. As previously mentioned, the first and second communications devices 1002, 1004 are operating in the communications network 1000.

As previously mentioned, in some first embodiments, the first RAT is the non-cellular network technology supporting D2D communication, such as the WLAN technology supporting D2D communication, and the second RAT is the cellular network technology supporting the proximity service such as the 3GPP cellular network ProSe technology.

As also previously mentioned, in some second embodiments, the first RAT is the non-cellular network technology such as the WLAN technology supporting pre-association discovery, and the second RAT is the cellular network technology supporting the proximity service such as the 3GPP cellular network ProSe technology.

In some embodiments, the first communications device 1002 comprises an input and output interface 1300 configured to communicate with one or more communications devices, e.g. to one or more of the second and/or third communications devices 1004, 1006. The input and output interface 1300 may comprise a wireless receiver (not shown) and a wireless transmitter (not shown).

The first communications device 1002 is configured to receive, e.g. by means of a receiving module 1301 configured to receive, information from the second communications device 1004. The receiving module 1301 may be implemented by or arranged in communication with a processor 1305 of the first communications device 1002. The processor 1305 will be described in more detail below.

In some first embodiments, the first communications device 1002 is configured to receive, by means of the first RAT or the proximity service provided by the second RAT, a response from the second communications device 1004, which response comprises information relating the proximity service provided by the second RAT.

In some second embodiments, the first communications device 1002 is configured to receive, from a third communications device 1006, information relating to the proximity service provided by the second RAT.

The first communications device 1002 is configured to transmit, e.g. by means of a transmitting module 1302 configured to transmit, information to the second communications device 1004. The transmitting module 1302 may be implemented by or arranged in communication with the processor 1305 of the first communications device 1002.

By means of the first RAT, the first communications device 1002 is configured to transmit, to the second communications device 1004, information relating to a proximity service provided by the second RAT. Thereby the information enables the second communications device 1004 to determine whether to use the first RAT or the proximity service provided by the second RAT for D2D communication with the first communications device 1002.

As previously mentioned, the information relating to the proximity service may comprise control information of the proximity service.

Further, the information relating to the proximity service may comprise one or more attributes of the second RAT including one or more of: configuration parameters, an identifier of an operator, an identifier of the first communications device 1002, a radio frequency for the operation of the proximity service, a point of time for the proximity service, information relating to termination of an ongoing service that should be stopped before the proximity service is started, and a quality of service for the proximity service.

In some embodiments, the information relating to the proximity service comprises a link indication indicating whether to use an existing communications link of the first RAT or a new communications link of the second RAT.

In some first embodiments and by means of the first RAT, the first communications device 1002 is configured to transmit, to the second communications device 1004, an indication of a frame format and of one or more frame fields to be used when transmitting information relating to the proximity service.

Further, in some first embodiments, the first communications device 1002 is configured to transmit information relating to the proximity service in a management frame such as a beacon frame, in a control frame, in a data frame such as an action frame, in a service discovery frame, in a discovery beacon frame, or in a control signalling frame.

Furthermore, in some first embodiments, the first communications device 1002 is configured to transmit the information using unicast, multicast or broadcast.

In some second embodiments, the first communications device 1002 is configured to transmit information relating to the proximity service by further being configured to transmit the information in a pre-association signal, a beacon signal or in a probe response signal.

The pre-association signal may comprise one or more GAS frames, one or more ANQP frames, or one or more ANQP-SD frames.

In some embodiments, the first communications device 1002 is configured to determine, e.g. by means of a determining module 1303 configured to determine, whether the proximity service provided by the second communications device 1004 is or will be available. The determining module 1303 may be implemented by or arranged in communication with the processor 1305 of the first communications device 1002.

When the first communications device 1002 is configured to determine whether the proximity service provided by the second communications device 1004 is or will be available, the information relating to the proximity service may comprise a time indication indicating a point in time when the proximity service provided by the second RAT is or will be available.

The first communications device 1002 may also comprise means for storing data. In some embodiments, the first communications device 1002 comprises a memory 1304 configured to store the data. The data may be processed or non-processed data and/or information relating thereto. The memory 1304 may comprise one or more memory units. Further, the memory 1304 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first communications device 1002.

Embodiments herein for performing for D2D communication with the second communications device 1004 using the first RAT or the second RAT may be implemented through one or more processors, such as the processor 1305 in the arrangement depicted in FIG. 13, together with computer program code for performing the functions and/or method actions of embodiments herein. The program code mentioned above may also be provided as a computer program product, for instance in the form of a data carrier carrying computer program code for performing the embodiments herein when being loaded into the first communications device 1002. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first communications device 1002.

Those skilled in the art will also appreciate that the input/output interface 1300, the receiving module 1301, the transmitting module 1302, and the determining module 1303 above may refer to a combination of analog and digital circuits, and/or one or more processors configured with software and/or firmware, e.g. stored in the memory 1304, that when executed by the one or more processors such as the processors in the first communications device 1002 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Examples of methods performed by the second communications device 1004 for D2D communication with the first communications device 1002 using the first RAT or the second RAT will now be described with reference to flowchart depicted in FIG. 14. The first and second communications devices 1002, 1004 are operating in the communications network 1000. The methods comprise one or more of the following actions. It should be understood that these actions may be taken in any suitable order and that some actions may be combined.

As previously mentioned, in some first embodiments, the first RAT is the non-cellular network technology supporting D2D communication, such as the WLAN technology supporting D2D communication, and the second RAT is the cellular network technology supporting the proximity service such as the 3GPP cellular network ProSe technology.

As also previously mentioned, in some second embodiments, the first RAT is the non-cellular network technology such as the WLAN technology supporting pre-association discovery, and the second RAT is the cellular network technology supporting the proximity service such as the 3GPP cellular network ProSe technology.

Action 1401

In some first embodiments and by means of the first RAT, the second communications device 1004 receives, from the first communications device 1002, an indication of a frame format and of one or more frame fields to be used when receiving information relating to a proximity service. Thereby, the second communications device 1004 will receive information about how the information relating to the proximity service will be transmitted.

Action 1402

By means of the first RAT, the second communications device 1004 receives, from the first communications device 1002, information relating to the proximity service provided by the second RAT.

The information relating to the proximity service may comprise control information of the proximity service.

In some embodiments, the information relating to the proximity service comprises one or more attributes of the second RAT including one or more of: configuration parameters, an identifier of an operator, an identifier of the first communications device 1002, a radio frequency for the operation of the proximity service, a point of time for the proximity service, information relating to termination of an ongoing service that should be stopped before the proximity service is started, and a quality of service for the proximity service.

Further, the information relating to the proximity service may comprise a time indication indicating a point in time when the proximity service provided by the second RAT is or will be available.

Furthermore, the information relating to the proximity service may comprise a link indication indicating whether to use an existing communications link of the first RAT or a new communications link of the second RAT.

In some first embodiments, the second communications device 1004 receives the information in a management frame such as a beacon frame, in a control frame, in a data frame such as an action frame, in a service discovery frame or a discovery beacon frame, or in a control signalling frame.

In some second embodiments, the second communications device 1004 receives the information in a pre-association signal, a beacon signal or in a probe response signal.

The pre-association signal may comprise one or more GAS frames, one or more ANQP frames, or one or more ANQP-SD frames.

Action 1403

The second communications device 1004 determines whether to use the first RAT or the proximity service provided by the second RAT. For example, the second communications device 1004 may determine to use the first RAT or the proximity service of the second RAT based on one or more of: a respective cost of using the respective RAT, a respective quality of service of the respective RAT, mobility and range support of the service, preferences of the user, hardware or software limitation of the device or network, etc.

Action 1404

The second communications device 1004 applies the determined first RAT or proximity service provided by the second RAT for D2D communication with the first communications device 1002. In other words, the second communications device 1004 may use the determined first RAT or the determined proximity service provided by the second RAT for D2D communication with the first communications device 1002. For example, the second communications device 1004 may, by means of the determined first RAT or the determined proximity service of the second RAT, send a message to the first communications device 1002.

Action 1405

In some first embodiments and by means of the determined first RAT or proximity service provided by the second RAT, the second communications device 1004 transmits a response to the first communications device 1002, which response comprises information relating proximity service provided by the second RAT.

Figure 15:
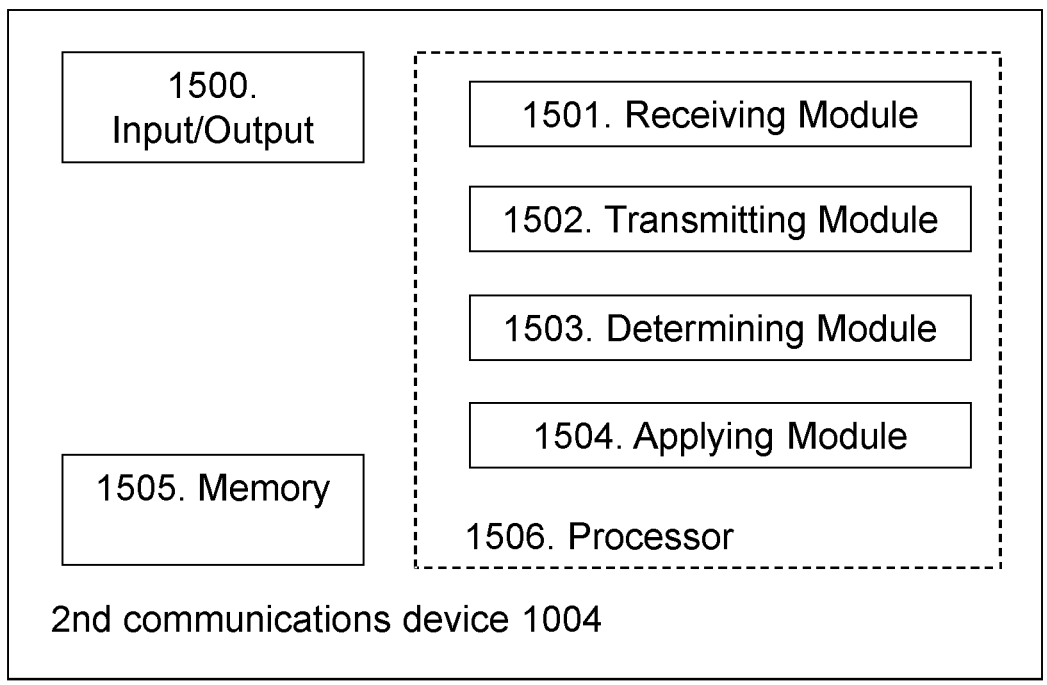
FIG. 15 is a block diagram schematically illustrating embodiments of a second communications device.

To perform the method for D2D communication with the first communications device 1002 using the first RAT or the second RAT, the second communications device 1004 may be configured according to an arrangement depicted in FIG. 15. As previously mentioned, the first and second communications devices 1002, 1004 are operating in the communications network 1000.

As previously mentioned, in some first embodiments, the first RAT is the non-cellular network technology supporting D2D communication, such as the WLAN technology supporting D2D communication, and the second RAT is the cellular network technology supporting the proximity service such as the 3GPP cellular network ProSe technology.

As also previously mentioned, in some second embodiments, the first RAT is the non-cellular network technology such as the WLAN technology supporting pre-association discovery, and the second RAT is the cellular network technology supporting the proximity service such as the 3GPP cellular network ProSe technology.

In some embodiments, the second communications device 1004 comprises an input and output interface 1500 configured to communicate with one or more communications devices, e.g. to one or more of the first and/or third communications devices 1002, 1006. The input and output interface 1500 may comprise a wireless receiver (not shown) and a wireless transmitter (not shown).

The second communications device 1004 is configured to receive, e.g. by means of a receiving module 1501 configured to receive, information from the first communications device 1002. The receiving module 1501 may be implemented by or arranged in communication with a processor 1506 of the second communications device 1004. The processor 1506 will be described in more detail below.

By means of the first RAT, the second communications device 1004 is configured to receive, from the first communications device 1002, information relating to a proximity service provided by the second RAT.

The information relating to the proximity service may comprise control information of the proximity service.

Further, the information relating to the proximity service may comprise one or more attributes of the second RAT including one or more of: configuration parameters, an identifier of an operator, an identifier of the first communications device 1002, a radio frequency for the operation of the proximity service, a point of time for the proximity service, information relating to termination of an ongoing service that should be stopped before the proximity service is started, and a quality of service for the proximity service.

Furthermore, the information relating to the proximity service may comprise a time indication indicating a point in time when the proximity service provided by the second RAT is or will be available.

In some embodiments, the information relating to the proximity service comprises a link indication indicating whether to use an existing communications link of the first RAT or a new communications link of the second RAT.

In some first embodiments, the second communications device 1004 is configured to, by means of the first RAT, receive, from the first communications device 1002, an indication of a frame format and of one or more frame fields to be used when receiving the information relating to the proximity service.

In some first embodiments, the second communications device 1004 is configured to receive information relating to the proximity service by further being configured to receive the information in a management frame such as a beacon frame, in a control frame, in a data frame such as an action frame, in a service discovery frame or a discovery beacon frame, or in a control signalling frame.

In some second embodiments, the second communications device 1004 is configured to receive information relating to the proximity service by further being configured to receive the information in a pre-association signal, a beacon signal or in a probe response signal.

The pre-association signal may comprise one or more GAS frames, one or more ANQP frames, or one or more ANQP-SD frames.

The second communications device 1004 is configured to transmit, e.g. by means of a transmitting module 1502 configured to transmit, information to the first communications device 1002. The transmitting module 1502 may be implemented by or arranged in communication with the processor 1506 of the second communications device 1004.

In some first embodiments, the second communications device 1004 is configured to, by means of the determined first RAT or proximity service provided by the second RAT, transmit a response to the first communications device 1002, which response comprises information relating proximity service provided by the second RAT.

The second communications device 1004 is configured to determine, e.g. by means of a determining module 1503 configured to determine, whether to use the first RAT or the proximity service provided by the second RAT. The determining module 1503 may be implemented by or arranged in communication with the processor 1506 of the second communications device 1004.

The second communications device 1004 is configured to apply, e.g. by means of an applying module 1504 configured to apply, the determined first RAT or proximity service provided by the second RAT for D2D communication with the first communications device 1002. The applying module 1504 may be implemented by or arranged in communication with the processor 1506 of the second communications device 1004.

The second communications device 1004 may also comprise means for storing data. In some embodiments, the second communications device 1004 comprises a memory 1505 configured to store the data. The data may be processed or non-processed data and/or information relating thereto. The memory 1505 may comprise one or more memory units. Further, the memory 1505 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the second communications device 1004.

Embodiments herein for performing for D2D communication with the first communications device 1002 using the first RAT or the second RAT may be implemented through one or more processors, such as the processor 1506 in the arrangement depicted in FIG. 15, together with computer program code for performing the functions and/or method actions of embodiments herein. The program code mentioned above may also be provided as a computer program product, for instance in the form of a data carrier carrying computer program code for performing the embodiments herein when being loaded into the second communications device 1004. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second communications device 1004.

Those skilled in the art will also appreciate that the input/output interface 1500, the receiving module 1501, the transmitting module 1502, the determining module 1503 and the applying module 1504 above may refer to a combination of analog and digital circuits, and/or one or more processors configured with software and/or firmware, e.g. stored in the memory 1505, that when executed by the one or more processors such as the processors in the second communications device 1004 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplary Embodiments

IEEE NAN Based LTE ProSe Discovery

Some embodiments herein address the scenarios where the Wi-Fi NAN technology is being used for service discovery and/or service offerings, and the LTE ProSe technology is used along with the Wi-Fi NAN technology for enhanced throughput, or improved reliability and application availability either by handoff or setting up an additional radio link. Some embodiments disclosed herein aim to realize these with minimal or at least reduced effort by introducing novel interoperability methods within the NAN technology domain.

According to the some embodiments, a NAN device, e.g. the first communications device 1002, indicates LTE ProSe-related information e.g., ProSe attributes to other NAN device(s), e.g. to the second communications device 1004, using NAN signaling frames. This relates to Actions 1204 and 1402 previously described.

The indication of the LTE ProSe attributes, by means of the NAN technology, may be based on at least one of the following: device capability and/or device preference, network capability and/or network preference and QoS support for the targeted application. The LTE ProSe attributes may comprise one or more of: LTE ProSe attributes that are relevant to one or more embodiments, as well as the LTE ProSe support, e.g., public safety, non-public safety, relay, the ProSe discovery mode, the TDD UL-DL configuration, the in-coverage indicator and the D2D system bandwidth etc.

In addition to the overall LTE ProSe attributes, the NAN device, e.g. the first communications device 1002, may indicate the time that the LTE ProSe function and/or the LTE ProSe connectivity may become possible to use e.g., when there is sufficient hardware resource and/or radio resource and protocol support available for maintaining the ProSe function. The information may be relative or absolute and may be used e.g., synchronizing and preparing a cluster of NAN devices for LTE ProSe communication. This relates to Actions 1203 and 1402 previously described.

Whether the NAN and the ProSe technologies are both in enabled mode or only the NAN technology is in the enabled mode, in either case some embodiments herein may provide the device, e.g. the second communications device 1004, with the necessary information to decide if using (an existing) or activing (a new) LTE ProSe link would be favorable or not.

The one or more information bits relevant to the LTE ProSe may be carried via a beacon frame, an action frame, a NAN service discovery frame or a NAN discovery beacon or other control signaling. The NAN device, e.g. the first communications device 1002, may either unicast, multicast or broadcast the LTE ProSe information to one or more other NAN devices, e.g. to the second communications device 1004. If the LTE ProSe technology is not available, there may be no field reserved for the LTE ProSe attributes. This may be seen as an implicit indication that the LTE ProSe technology is not available. If the LTE ProSe technology is available, then the attributes may be sent in those fields saving one additional step to inquire the LTE ProSe attributes because allocating a field and/or an information element and/or a frame is already an implicit indication that the NAN device, e.g. the first communications device 1002, is available for ProSe communications. This relates to Actions 1203, 1204, 1401 and 1402 previously described.

The NAN service discovery frame is a vendor specific public action frame as defined in the IEEE 802.11 specification (IEEE Std 802.11, 2012) and extended in the Wi-Fi Alliance NAN technical specification (Wi-Fi Alliance Wi-Fi Neighbor Awareness Networking (NAN) Technical Specification Version 1.0), by adding the NAN attributes. One possible way to implement some embodiments disclosed herein is based on adding the LTE ProSe attributes, as a part of the NAN attributes in a NAN service discovery frame or having an additional field of LTE ProSe attributes in the NAN Service discovery frame. FIG. 16 schematically illustrates embodiments of a NAN service discovery frame format comprising an LTE ProSe capability attribute. Alternatively or additionally, the LTE ProSe attributes may be comprised in a NAN synchronization and NAN discovery beacon frame format. FIG. 17 schematically illustrates embodiments of a NAN synchronization and NAN discovery beacon frame format comprising an LTE ProSe capability attribute.

After receiving the LTE ProSe information, a NAN device, e.g. the second communications device 1004, may initiate the required procedures to set up an LTE ProSe link e.g., along with the NAN radio connectivity. This relates to Actions 1403 and 1404 previously described. For example, this may be utilised for data aggregation, e.g., with the help of multi-path Transmission Control Protocol (TCP), in order to improve the application data throughput. It may also be utilized for improving the application availability by offering an additional data link, e.g., the LTE ProSe, as a fall-back option. Furthermore, it may be simply to satisfy the reliability requirement and/or the QoS requirement by means of licensed band operation in the LTE ProSe at least for the critical part of the data communication. In some other embodiments, the communication is switched from Wi-Fi NAN to LTE ProSe when LTE ProSe is indicated as an available communication option with a set of attributes that help setting up a ProSe link. In this case, the master device of the NAN cluster or the NAN service provider, e.f. the first communications device 1002, may indicate that there will be a move to the LTE ProSe, e.g. at a specified point in time, helping other members of the cluster, e.g. the second communications device 1004, to prepare and move, so as to seamlessly run the service.

The Pre-Association ProSe Discovery

Figure 18:
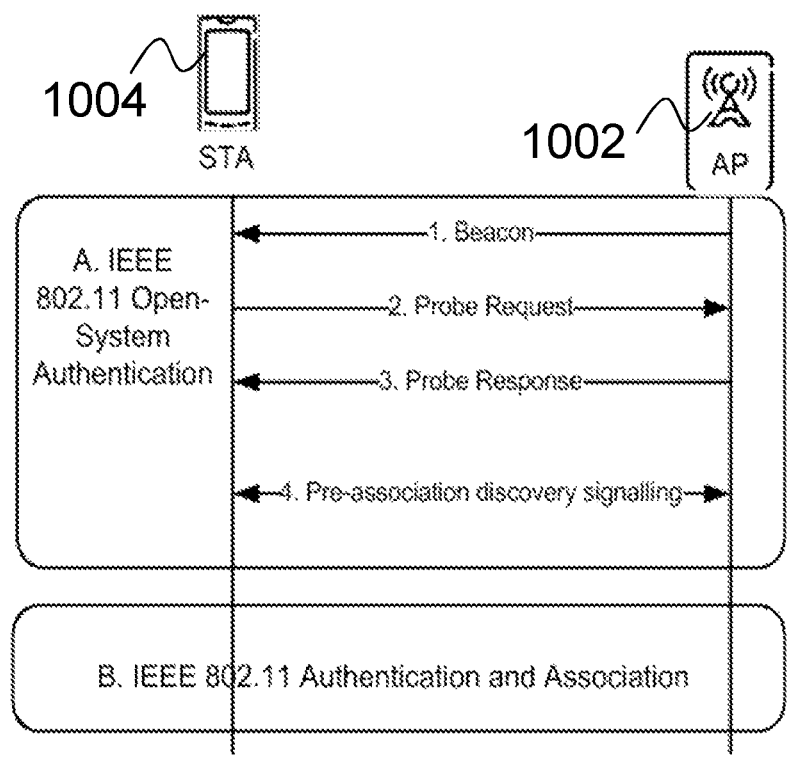
FIG. 18 schematically illustrates embodiments of a pre-association discovery procedure.

In some embodiments, a pre-association WLAN signalling is used in order to indicate the ProSe capabilities, such as one of more of the capabilities described above. A detailed pre-association discovery procedure is illustrated in FIG. 18. In this case, the first communications device 1002, e.g. an AP, may advertise ProSe information which relates to itself, e.g., if the AP is a device that supports ProSe, such as a Mobile AP or a sensor gateway. This relates to Actions 1202-1204 previously described. Another possibility is for the first communications device 1002, e.g. the AP, to advertise ProSe information related to another device within its population. In other words, if the third communications device 1006, e.g. a STA, which is connected to the first communications device 1002, e.g. the AP, supports ProSe and has indicated this information to the AP, then the AP may relay that information to future STAs, e.g. the second communications device 1004, seeking association with it. This relates to Actions 1201-1204 previously described.

Figure 19:
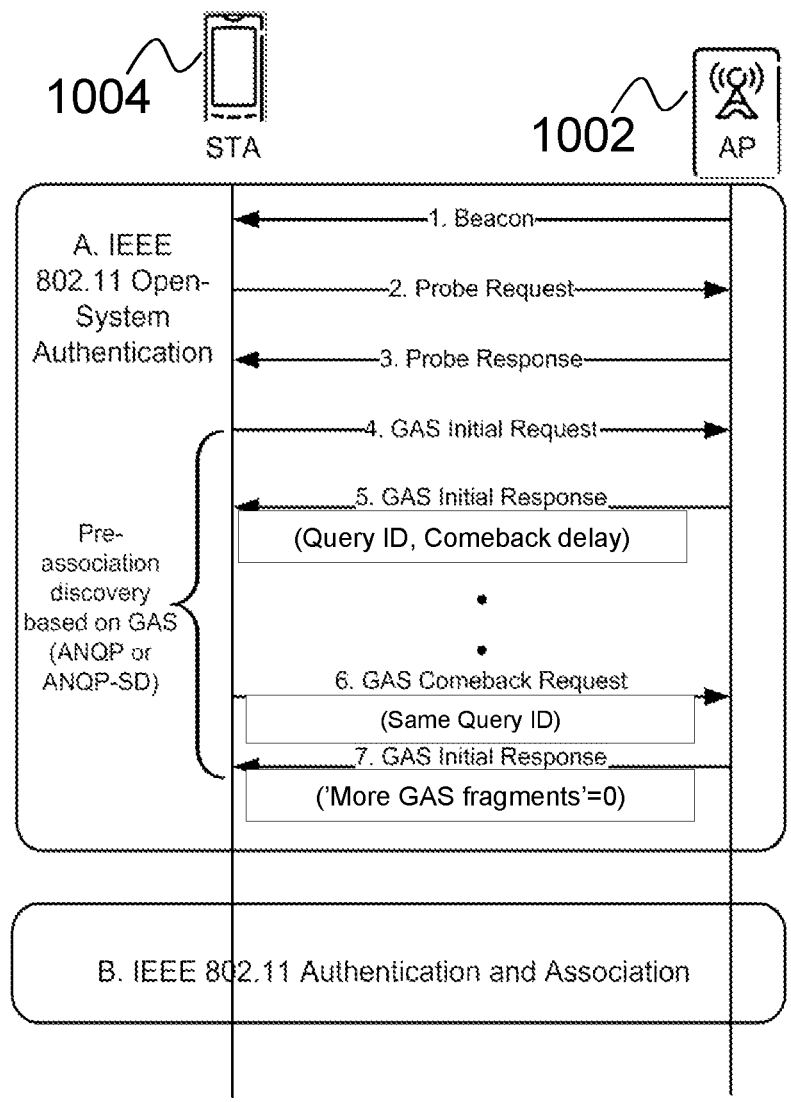
FIG. 19 schematically illustrates embodiments of a pre-association discovery procedure via an Access Network Query Protocol (ANQP) and ANQP Service Discovery (ANQP-SD).

In some other embodiments, the pre-association signalling used to advertise ProSe information is compliant with the ANQP or the ANQP-SD, both of which use the GAS Protocol for service advertisement and discovery. The GAS frames encapsulate both the ANQP and ANQP-SD frames. More elaborate example of this is shown in FIG. 19. A way to implement this is to include ProSe as one of the protocols that are advertised in the pre-association discovery and assign it a special protocol ID, e.g. a service name. The protocol ID may be comprised in a service hash field in the Service Hash element. Another possibility is to advertise ProSe in the Advertisement Protocol element in Beacons or Probe Responses.

Some Examples of LTE Prose Attributes

For example, the LTE ProSe attributes may comprise (see 3GPP TS 23.303 V13.0.0):

Application ID: A globally unique identifier identifying a specific application. This is the identifier used in mobile operating systems by the applications within the mobile operating system. All mobile operating systems have namespaces that identify the applications within the mobile operating system.

Application Layer User ID: An identity identifying a user within the context of a specific application, e.g. alice@social.net. The format of this identifier is outside the scope of 3GPP.

Application Level Container: An application layer package opaque to the 3GPP networks.

Destination Layer-2 ID: A link-layer identity that identifies a device or a group of devices that are recipients of the ProSe communication frames.

Discovery Entry ID: An identifier allocated by the ProSe Function to reference a discovery entry in the communications device's context as a result of a discovery request. It is returned to the communications device in a Discovery Response, and may be used in the following procedures by either the ProSe Function or the communications device to refer to the discovery entry.

Discovery Filter: A container of a ProSe Application code, zero or more ProSe Application Mask(s) and Time To Live value. These are used by the monitoring communications device to match ProSe Application Codes that are received on the PC5 interface for Direct Discovery.

EPC ProSe User ID: An identifier for EPC-level ProSe Discovery and EPC support for WLAN direct communication that uniquely identifies a communications device registered for the ProSe. This identifier may be occasionally reassigned by the ProSe Function.

EPC-level ProSe Discovery: A ProSe Discovery procedure by which the EPC determines the proximity of two ProSe-enabled communications devices and informs them of their proximity.

Geographical Area: The Geographical Area identifies a region, whose borders are defined by means of suitable geographic coordinates of e.g. a polygon or circle outlining its borders.

Local PLMN: A PLMN which is not the serving PLMN of the monitoring communications device, and in whose radio resources the monitoring communications device is authorized by a Home PLMN (HPLMN) to engage in ProSe Direct Discovery.

ProSe Application ID: The ProSe Application ID is an identity used for ProSe Direct Discovery, identifying application related information for the ProSe-enabled communications device. Each ProSe Application ID may be globally unique, e.g. in case of open Direct Discovery.

ProSe Application Code: The ProSe Application Code is associated with the ProSe Application ID and is used in the discovery procedures.

ProSe Application Mask: The ProSe Application Mask is provided by the ProSe Function in order to allow the monitoring communications device to perform partial matching of ProSe Application Codes on the PC5 interface.

ProSe Query Code: The ProSe Query Code is a ProSe Application Code or ProSe Restricted Code allocated by the ProSe Function in the HPLMN to the Discoverer communications device for Model B discovery. The ProSe Query Code is sent by the Discoverer communications device over the air.

ProSe Response Code: The ProSe Response Code is a ProSe Application Code or ProSe Restricted Code allocated by the ProSe Function in the HPLMN to the Discoveree communications device for Model B discovery. The ProSe Response Code is sent by the Discoveree communications device over the air upon receiving a ProSe Query Code matching the Discovery Filter.

Discovery Query Filter: This is a Discovery Filter that is allocated by the ProSe Function in the HPLMN to the Discoveree communications device for Model B discovery. The Discovery Query Filter is used by the Discoveree communications device to determine if a ProSe Query Code received over the air should trigger sending of a ProSe Response Code.

Discovery Response Filter: This is a Discovery Filter that is allocated by the ProSe Function in the HPLMN to the Discoverer communications device for Model B discovery. The Discovery Response Filter is used by the Discoverer communications device to determine if there is a match with a ProSe Response Code received over the air in response to a previously announced ProSe Query Code by the Discoverer communications device.

ProSe Restricted Code: ProSe Restricted Code is allocated by the ProSe Function in the HPLMN for Restricted Direct Discovery and is associated with one or more Restricted ProSe App User IDs based on the policy of the ProSe Function that allocates it. The ProSe Restricted Code is sent by the announcing communications device over the air.

ProSe Restricted Code Prefix: For restricted Direct Discovery with application-controlled extension, a part of the ProSe Restricted Code that is assigned by the ProSe Function in the HPLMN.

ProSe Restricted Code Suffix: For restricted Direct Discovery with application-controlled extension, a part of the ProSe Restricted Code that is under the control of the ProSe Application Server. The ProSe Restricted Code Suffix represents application specific information pertaining to the application that is indicated in the restricted ProSe App User ID.

ProSe Discovery UE ID: A temporary identifier assigned by the ProSe Function in the HPLMN to the communications device for the restricted direct discovery service. It includes the PLMN ID and a temporary identifier that uniquely identifies the communications device in the HPLMN.

ProSe Function ID: A Fully Qualified Domain Name (FQDN) that identifies a ProSe Function.

ProSe Layer-2 Group ID: A layer-2 group identifier that may be used to address a set of users at the 3GPP lower layers. This ID needs to be configured in the communications device before enabling one-to-many ProSe Direct Communication.

Restricted ProSe Application User ID: An identifier associated with the Application Layer User ID in the ProSe Application Server in order to hide/protect the application level user identity from the 3GPP layer. It unambiguously identifies the user within a given application. The format of this identifier is outside the scope of 3GPP.

Source Layer-2 ID: A link-layer identity that identifies a device that originates ProSe communication frames.

WLAN Link Layer ID: A link layer identity used for WLAN direct discovery and/or WLAN direct communication. Depending on the WLAN technology it may be temporary (e.g. temporary MAC address) or permanent (e.g. permanent MAC address). The format of this identifier depends on the WLAN technology and is outside of the 3GPP scope.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A second communications device for Device-to-Device (D2D) communication with a first communications device using a first Radio Access technology (RAT) or a second RAT, wherein the first and second communications devices are operating in a communications network, and wherein the second communications device comprises:
one or more processors and a memory, the memory containing computer program code executable by the one or more processors whereby the second communications device is configured to:
by means of the first RAT, receive, from the first communications device, an indication of a frame format and of one or more frame fields to be used when receiving information relating to a proximity service;
by means of the first RAT, receive, from the first communications device, the information relating to the proximity service provided by the second RAT;
determine whether to use the first RAT or the proximity service provided by the second RAT; and
apply the determined first RAT or proximity service provided by the second RAT for D2D communication with the first communications device.

2. The second communications device of claim 1, wherein the information relating to the proximity service comprises control information of the proximity service.

3. The second communications device of claim 1, wherein the information relating to the proximity service comprises one or more attributes of the second RAT including one or more of: configuration parameters, an identifier of an operator, an identifier of the first communications device, a radio frequency for the operation of the proximity service, a point of time for the proximity service, information relating to termination of an ongoing service that should be stopped before the proximity service is started, and a quality of service for the proximity service.

4. The second communications device of claim 1, wherein the information relating to the proximity service comprises a time indication indicating a point in time when the proximity service provided by the second RAT is or will be available.

5. The second communications device of claim 1, wherein the information relating to the proximity service comprises a link indication indicating whether to use an existing communications link of the first RAT or a new communications link of the second RAT.

6. The second communications device of claim 1, wherein the first RAT is a Wireless Local Area Network, WLAN, technology supporting D2D communication, and wherein the second RAT is a 3rd Generation Partnership Project, 3GPP, cellular network Proximity Service, ProSe, technology.

7. A method performed by a second communications device for Device-to-Device, D2D, communication with a first communications device using a first Radio Access technology, RAT, or a second RAT, wherein the first and second communications devices are operating in a communications network, and wherein the method comprises:
by means of the first RAT, receiving, from the first communications device, an indication of a frame format and of one or more frame fields to be used when receiving information relating to a proximity service;
by means of the first RAT, receiving, from the first communications device, the information relating to the proximity service provided by the second RAT;
determining whether to use the first RAT or the proximity service provided by the second RAT; and
applying the determined first RAT or proximity service provided by the second RAT for D2D communication with the first communications device.

8. The method of claim 7, wherein the information relating to the proximity service comprises one or more of:
control information of the proximity service;
one or more attributes of the second RAT including one or more of: configuration parameters, an identifier of an operator, an identifier of the first communications device, a radio frequency for the operation of the proximity service, a point of time for the proximity service, information relating to termination of an ongoing service that should be stopped before the proximity service is started, and a quality of service for the proximity service;
a time indication indicating a point in time when the proximity service provided by the second RAT is or will be available; and
a link indication indicating whether to use an existing communications link of the first RAT or a new communications link of the second RAT.

9. The method of claim 8, wherein the first RAT is a Wireless Local Area Network, WLAN, technology supporting D2D communication, and wherein the second RAT is a 3rd Generation Partnership Project, 3GPP, cellular network Proximity Service, ProSe, technology.

10. A first communications device for Device-to-Device (D2D) communication with a second communications device using a first Radio Access Technology (RAT) or a second RAT, wherein the first and second communications devices are operating in a communications network, and wherein the first communications device comprises:
one or more processors and a memory, the memory containing computer program code executable by the one or more processors whereby the first communications device is configured to,
by means of the first RAT, transmit, to the second communications device, an indication of a frame format and of one or more frame fields to be used when transmitting information relating to a proximity service; and
by means of the first RAT, transmit, to the second communications device, the information relating to the proximity service provided by the second RAT, whereby the information enables the second communications device to determine whether to use the first RAT or the proximity service provided by the second RAT for D2D communication with the first communications device.

11. The first communications device of claim 10, further configured to:
determine whether the proximity service provided by the second communications device is or will be available, and wherein the information relating to the proximity service comprises a time indication indicating a point in time when the proximity service provided by the second RAT is or will be available.

12. The first communications device of claim 10, wherein the information relating to the proximity service comprises control information of the proximity service.

13. The first communications device of claim 10, wherein the information relating to the proximity service comprises one or more attributes of the second RAT including one or more of: configuration parameters, an identifier of an operator, an identifier of the first communications device, a radio frequency for the operation of the proximity service, a point of time for the proximity service, information relating to termination of an ongoing service that should be stopped before the proximity service is started, and a quality of service for the proximity service.

14. The first communications device of claim 10, wherein the information relating to the proximity service comprises a link indication indicating whether to use an existing communications link of the first RAT or a new communications link of the second RAT.

15. The first communications device of claim 10, wherein the first RAT is a Wireless Local Area Network, WLAN, technology supporting D2D communication, and wherein the second RAT is a 3rd Generation Partnership Project, 3GPP, cellular network Proximity Service, ProSe, technology.

16. A method performed by a first communications device for Device-to-Device (D2D) communication with a second communications device using a first Radio Access Technology (RAT) or a second RAT, wherein the first and second communications devices are operating in a communications network, and wherein the method comprises:
by means of the first RAT, transmitting, to the second communications device, an indication of a frame format and of one or more frame fields to be used when transmitting information relating to a proximity service; and
by means of the first RAT, transmitting, to the second communications device, the information relating to the proximity service provided by the second RAT, whereby the information enables the second communications device to determine whether to use the first RAT or the proximity service provided by the second RAT for the D2D communication with the first communications device.

17. The method of claim 16, wherein the information relating to the proximity service comprises one or more of:
control information of the proximity service;
one or more attributes of the second RAT including one or more of: configuration parameters, an identifier of an operator, an identifier of the first communications device, a radio frequency for the operation of the proximity service, a point of time for the proximity service, information relating to termination of an ongoing service that should be stopped before the proximity service is started, and a quality of service for the proximity service;

a time indication indicating a point in time when the proximity service provided by the second RAT is or will be available; and a link indication indicating whether to use an existing communications link of the first RAT or a new communications link of the second RAT.

* * * * *